United States Patent
Wilson et al.

(10) Patent No.: US 8,722,605 B2
(45) Date of Patent: May 13, 2014

(54) WATER-BASED CLEANER FOR CLEANING SOLVENT-BASED PAINTS

(75) Inventors: Neil R. Wilson, Lake Orion, MI (US); Michael A. Murphy, Jr., Sterling Heights, MI (US)

(73) Assignee: Henkel AG & Co. KGaA, Duesseldorf (DE)

( * ) Notice: Subject to any disclaimer, the term of this patent is extended or adjusted under 35 U.S.C. 154(b) by 217 days.

(21) Appl. No.: 13/153,511

(22) Filed: Jun. 6, 2011

(65) Prior Publication Data

US 2011/0281781 A1 Nov. 17, 2011

Related U.S. Application Data

(63) Continuation of application No. PCT/US2009/068226, filed on Dec. 16, 2009.

(60) Provisional application No. 61/139,846, filed on Dec. 22, 2008.

(51) Int. Cl.
*C11D 7/50* (2006.01)
*C11D 17/00* (2006.01)
*C11D 3/43* (2006.01)

(52) U.S. Cl.
CPC ............. *C11D 17/0021* (2013.01); *C11D 3/43* (2013.01)
USPC ........... 510/206; 510/201; 510/202; 510/417; 134/40

(58) Field of Classification Search
CPC .............................. C11D 17/0021; C11D 3/43
USPC .............................. 510/201, 206, 417; 134/40
See application file for complete search history.

(56) References Cited

U.S. PATENT DOCUMENTS

| | | | |
|---|---|---|---|
| 2,996,450 A | 8/1961 | Zech et al. | |
| 3,057,804 A | 10/1962 | Berkeley et al. | |
| 3,673,124 A * | 6/1972 | Holm | 507/259 |
| 4,055,433 A * | 10/1977 | Morones | 106/10 |
| 4,745,154 A | 5/1988 | Ruffner | |
| 4,749,516 A * | 6/1988 | Brusky | 510/284 |
| 4,829,897 A * | 5/1989 | Wyman et al. | 101/483 |
| RE33,210 E | 5/1990 | Stoufer | |
| 5,076,954 A | 12/1991 | Loth et al. | |
| 5,080,831 A | 1/1992 | VanEenam | |
| 5,082,584 A | 1/1992 | Loth et al. | |
| 5,108,643 A | 4/1992 | Loth et al. | |
| 5,158,710 A | 10/1992 | VanEenam | |
| 5,171,475 A | 12/1992 | Freiesleben | |
| 5,176,986 A | 1/1993 | Telser et al. | |
| 5,246,503 A | 9/1993 | Minick | |
| 5,518,661 A * | 5/1996 | Langford et al. | 252/364 |
| 5,597,792 A | 1/1997 | Klier et al. | |
| 5,632,822 A | 5/1997 | Knipe et al. | |
| 5,701,922 A | 12/1997 | Knipe et al. | |
| 5,709,749 A | 1/1998 | Dion et al. | |
| 5,759,975 A | 6/1998 | Maxwell et al. | |
| 5,811,383 A | 9/1998 | Klier et al. | |
| 5,854,190 A | 12/1998 | Knipe et al. | |
| 5,932,493 A | 8/1999 | Akatsu et al. | |
| 5,955,410 A * | 9/1999 | Dingess et al. | 510/202 |
| 5,972,865 A | 10/1999 | Knipe et al. | |
| 6,074,986 A | 6/2000 | Mulqueen et al. | |
| 6,280,485 B1 | 8/2001 | Daly et al. | |
| 6,824,623 B1 | 11/2004 | Gross et al. | |
| 6,849,575 B2 | 2/2005 | Haesslin et al. | |
| 6,929,707 B2 | 8/2005 | Mullay et al. | |
| 6,984,616 B2 | 1/2006 | Fedrigo et al. | |
| 7,030,073 B2 * | 4/2006 | McCammon | 510/138 |
| 7,053,037 B2 | 5/2006 | Smith et al. | |
| 7,176,174 B2 * | 2/2007 | Filippini et al. | 510/201 |
| 7,271,199 B1 | 9/2007 | Quinn et al. | |
| 2002/0128157 A1 | 9/2002 | Bates et al. | |
| 2003/0069135 A1 | 4/2003 | Kober et al. | |
| 2003/0134764 A1* | 7/2003 | Hensley | 510/201 |
| 2003/0225168 A1* | 12/2003 | Deroo et al. | 516/77 |
| 2004/0063594 A1* | 4/2004 | McCammon | 510/130 |
| 2004/0071716 A1 | 4/2004 | Jansen et al. | |
| 2004/0176263 A1* | 9/2004 | Filippini et al. | 510/201 |
| 2005/0026799 A1 | 2/2005 | Detar et al. | |
| 2005/0227347 A1 | 10/2005 | Gregory et al. | |
| 2006/0058208 A1 | 3/2006 | Ventura et al. | |
| 2006/0199742 A1 | 9/2006 | Arisz et al. | |
| 2006/0211593 A1* | 9/2006 | Smith et al. | 510/424 |
| 2007/0095003 A1 | 5/2007 | Hei et al. | |
| 2009/0114394 A1* | 5/2009 | Javora et al. | 166/312 |

FOREIGN PATENT DOCUMENTS

| | | |
|---|---|---|
| DE | 10310523 | 9/2004 |
| EP | 1078031 | 11/1999 |
| EP | 1141224 | 7/2000 |
| EP | 1125019 | 4/2003 |
| WO | WO9905631 | 11/1999 |
| WO | WO02089573 | 11/2002 |

OTHER PUBLICATIONS

L. Leal-Calderon et al. "Water-in-oil emulsions: Role of the solvent moleculart size on droplet interactions." Langmuir 1997, 13, 7008-7011.
International Search Report for PCT/US2009/068226, dated Jul. 28, 2010.
European Search Report for EP09835615, dated Apr. 12, 2012.

* cited by examiner

*Primary Examiner* — Gregory Webb
(74) *Attorney, Agent, or Firm* — Mary K. Cameron

(57) ABSTRACT

A "water-in-oil emulsion" comprising a solvent or solvent blend; water; an emulsifier; optionally an emulsion stability additive, such as a surfactant, preferably anionic and optionally a paint compatibility additive, such as esters, ketones, alcohols.

24 Claims, No Drawings

WATER-BASED CLEANER FOR CLEANING SOLVENT-BASED PAINTS

CROSS-REFERENCE TO RELATED CASES

This application is a continuation under 35 U.S.C. Section 365(c) and 120 of International Application No. PCT/US2009/068226, filed Dec. 16, 2009 and published on Jul. 1, 2010 as WO 2010/075129, which claims priority from U.S. Provisional Patent Application No. 61/139,846, filed Dec. 22, 2008, which are incorporated herein by reference in their entirety.

FIELD OF THE INVENTION

This invention relates to water-in-oil emulsion compositions useful for removing non-aqueous coatings that have not been cured, such as uncured solvent-based paint. These compositions generally comprise water, at least one solvent have low solubility in water, at least one emulsifier and at least one surfactant different from the at least one emulsifier. The invention also relates to processes of making and using these compositions.

BACKGROUND OF THE INVENTION

Solvent paint line flushing cleaners are known to remove un-cured paint from paint application delivery equipment that is used in automotive, furniture and architectural markets. Typically, a solvent cleaner is used for removing a previous paint from the paint spray delivery equipment during a color change cycle by circulating the cleaner through the equipment. This process cleans the previous solvent-based paint color from the paint applicator and prepares it for the next color, thus avoiding color carry over issues. The solvent-based paint being cleaned from the equipment may include epoxy resins, polyether resins, polyacrylate resins, polyurethane resins, polyester resins, melamine resins and combinations of the above resins.

Solvent-based paint line flushing cleaners, also referred to herein as solvent-based purges, have also been used in the industry for several years. These cleaners are typically liquids that are have as the greatest percentage component solvents, sometimes in combination with wax or thickeners. Both 100% solvent and solvent-based purges include volatile organic compounds (VOCs) that readily evaporate into the atmosphere. One negative aspect relating to the use of 100% solvent or solvent-based paint line flushing cleaners has been the generation of VOCs. State and federal laws limit the amount of VOC emissions that can be released into the environment. Each regulated facility must comply with these laws and there is thus a need for low VOC emitting paint line flushing cleaners that provide cleaning benefits comparable to higher VOC paint line flushing cleaners.

The government approach to control VOC emissions has been to exempt certain solvents from the emissions limits as being "VOC-free". This gives the user the option in some states to subtract the % wt. portion of the exempt solvent from the solvent purge blend resulting in a lower VOC emission per pound of solvent used. The instant invention improves on this approach by actually reducing the total organic solvent used by providing a purging composition that contains more water, which is a not a Volatile Organic Compound (VOC). The resulting solution provides a true reduction in VOC's and a purge that overall is better for the environment.

Cleaners for paint that contain water are known in the art, including water-based alkaline cleaners, water-based solutions of various chemicals dissolved in water and water-based emulsions where water is the continuous phase with a discontinuous organic phase such as solvent.

Water-based alkaline cleaners have been used to remove solvent-based paint from application equipment. Drawbacks of these alkaline cleaners include attack of the paint application delivery equipment and incomplete dissolution of paint. The alkaline cleaners have not shown any sign of actually solvating the paint, which can result in residual paint particles left in the paint lines after purging. As for paint compatibility, the alkaline water-based cleaners leave sufficient amounts of water behind to contaminate the next incoming paint color, which leads to paint defects.

Other water-based coatings removers typically contain mostly water, combined with solvent and optionally surfactant in the form of solutions of solvent in water or emulsions in which the water is the continuous phase and the solvent is the discontinuous phase (oil-in-water emulsion). When applied to a painted or coated substrate, these compositions can soften or dissolve the paint or coating, and bring it to such a condition that it can be removed. The solvents that are typically used include methylene chloride, mineral spirits, toluene, alcohols, acetone, methyl ethyl ketone and N-methylpyrrolidone. One problem with these coatings removers is that many of the solvents that are used are classified as volatile organic compounds (VOC) and as a result their use leads to air emission problems. The present invention provides a solution to this problem.

Solvent-in-water emulsions, that is water continuous emulsions, are easy to make but tend to generate a great deal of foam. These types of emulsions have a water continuous phase and have similar solvency problems dissolving solvent based paint as do water based alkaline cleaning formulas. Most solvent-based paints contain solvents that are not water soluble. When these paints come into contact with water, the paint and water repel each other and the paint tends to fall out of solution and stick inside the application equipments tubing, color changing device and applicator spray cap or bell cup. These residual paint particles result in defects in the new color.

Micro-emulsions are emulsions that appear as translucent clear solutions but have a distinct continuous phase of either water or solvent. It is possible to prepare a thermodynamically stable micro-emulsion with a solvent continuous phase. In order to do this, the system must contain a high percentage of water soluble coupling solvents which increase the cost of the composition and negatively impact the solvating action of the system toward solvent based paint. Micro-emulsions known in the art do not perform as well as the invention described herein in removing or solvating solvent-based paint and are more costly.

With the present invention, a water-in-oil emulsion composition is provided that is useful as a remover for non-aqueous coatings, the use of this remover reduces the amount of volatiles emitted as compared to non-water-in-oil emulsion prior art coatings removers and yet provides desired coating removal properties.

SUMMARY OF THE INVENTION

The invention relates to a "water-in-oil emulsion" comprising:
(A) a solvent or solvent blend;
(B) water;
(C) an emulsifier;
(D) optionally an emulsion stability additive, such as a surfactant different from (C), preferably anionic; and (E) optionally, a paint compatibility additive, such as esters, ketones, alcohols. The paint compatibility additive may be aromatic.

In the water-in-oil emulsion, the continuous phase is the oil phase, also known as the solvent phase, understood by those of skill in the art to mean an organic phase substantially insoluble in water. Desirably, the solvent blend used in the invention includes materials having low or no solubility in water. The oil or solvent phase is continuous and dispersed therein as the discontinuous phase is an aqueous phase. The emulsified discontinuous water phase is stably dispersed in the solvent phase such that during use in a working purge environment, the two phases do not separate into layers and the emulsion does not invert to a solvent-in-water, aka oil-in-water, emulsion.

In one embodiment, the composition is a water-in-solvent emulsion having the following properties:
1) Less than 50 cps viscosity
2) Resistivity value>than 10K Ohms
3) Less than in increasing order of preference 10, 9, 8, 7, 6, 5, 4, 3, 2, 1% by weight of solvents defined as having a solubility in water of greater than 10, 9, 8, 7, 6, 5, 4, 3, 2, 1% by weight at 20° C.

In another embodiment, the composition is a water-in-solvent emulsion containing an emulsifier (C) characterized by the following properties:
1) emulsifiers having the following block structure: ABA
where B is Polypropylene oxide containing 40 or greater repeat units
where A is Polyethylene oxide containing 20 or less repeat units; and/or
2) emulsifiers having the following block structure: $[(A)(B)]_2(Y)[(A)(B)]_2$
where Y contains tetra functional groups capable of making alkoxylated chains
where A contains polyethylene oxide repeat units
where B contains polypropylene oxide (or polybutylene oxide) repeat units having greater than 20 repeat units per chain end.

In another embodiment, the composition is a water-in-solvent emulsion, solvent being the continuous phase, composition comprising: an emulsifier having a 2 or more hydrophobic groups containing greater than 18 carbons atoms per group with the hydrophilic group being essentially made up of ethylene oxide repeat units.

In another embodiment, the composition is a water-in-solvent emulsion, comprising:
A. about 30% to 80% by weight of a solvent or solvent blend selected such that
solvent or solvent blend vapor pressure is greater than 0.1 mm Hg at 20° C.;
the solvent or solvent blend composition contains less than 20% weight of a solvent or solvents having a water solubility greater than 10% by weight water in the individual solvent;
B. about 20% to 75% by weight water;
C. about 0.01 to 5% by weight of an emulsifier having a water solubility less than 10% by weight in water;
wherein the emulsion is a water-in-solvent emulsion having a solvent continuous phase, said emulsion having a resistivity greater than 10 Kohms measured at 20° C. using a Rhansburg Resistivity Meter and a viscosity less than 100 cps measured at 20° C.

Except in the claims and the operating examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, throughout this description, unless expressly stated to the contrary: percent, "parts of", and ratio values are by weight; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description or of generation in situ by chemical reactions specified in the description, and does not necessarily preclude other chemical interactions among the constituents of a mixture once mixed; specification of materials in ionic form additionally implies the presence of sufficient counter ions to produce electrical neutrality for the composition as a whole (any counter ions thus implicitly specified should preferably be selected from among other constituents explicitly specified in ionic form, to the extent possible; otherwise such counter ions may be freely selected, except for avoiding counter ions that act adversely to the objects of the invention); the term "paint" includes all like materials that may be designated by more specialized terms such as primer, lacquer, enamel, varnish, shellac, topcoat, and the like; and the term "mole" and its variations may be applied to elemental, ionic, and any other chemical species defined by number and type of atoms present, as well as to compounds with well defined molecules.

DETAILED DESCRIPTION OF PREFERRED EMBODIMENTS

The invention comprises, preferably consists essentially of, most preferably consists of: a water-in-solvent emulsion having a solvent continuous phase and a discontinuous water phase, the emulsion comprising:
(A) at least one solvent having low solubility in water;
(B) water;
(C) at least one emulsifier different from (A)-(B); optionally
(D) at least one emulsion stability additive, desirably comprising at least one surfactant different from (A)-(C); and
optionally (E) at least one paint compatibility additive and/or stabilizer different from (A)-(D).

Solvent or solvent blends useful as component (A) of this invention have a solvent or solvent blend vapor pressure greater than 0.1 mm Hg at the operational temperature, a more preferred vapor pressure greater than 0.4 mm Hg at 20° C. and an optimal vapor pressure greater than 2.0 mm Hg at 20° C. In general, higher vapor pressure solvents have greater kinetic energy and solvate organic polymers faster than those with similar thermodynamic properties but lower vapor pressures. To offset the slower dissolution rate of low vapor pressure solvents, the solvent continuous emulsion can be heated. Suitable temperatures depend on the overall vapor pressure of the blend. Heat exchangers may be used to heat typical emulsion solutions from ambient temperature to 27° C. to 66° C., which would raise the solvent blend's vapor pressure and improve the performance.

Suitable solvent or solvent blends used to create the solvent phase of the emulsion desirably have a water saturation level in solvent of less than 10% wt., a more preferred water saturation level in solvent of less than 5% wt. and an optimal water saturation level of less than 3% wt. The solvent blend used can be based on a blend using one solvent with a less than 10% wt. water saturation level mixed with a solvent that has a water saturation level of greater than 10% wt. The level of the solvent with a water saturation level greater than 10% wt.

preferably is kept at less than 10% wt. of the total emulsion or reduced performance and stability may occur. Aromatic and aliphatic based solvents are useful to drive down the water saturation level of solvent blends containing solvent with higher water saturation points.

The solvent or solvent blends desirably have a high resistivity value when in the emulsion form. The solvent continuous emulsion preferably has a resistivity value of greater than 10 kiloohms (Kohms) measured as is known in the art using a Ransberg resistivity meter. Some paint application systems use electrostatic paint equipment that requires greater than 100 Kohms in order to operate. Resistivity measurements of less than 10 Kohms of a solvent continuous, water-in-solvent emulsion generally results in poor emulsion stability or emulsion inversion to a water continuous emulsion.

Suitable solvents can be one or more of the following, which may be used alone or in a solvent blend meeting the parameters described above:

Aromatics: Aromatic 100, xylene, toluene, Aromatic 150, ethyl benzene

Ketones: methyl propyl ketone, methyl isobutyl ketone, methyl amyl ketone, cyclohexanone, diisobutyl ketone, methyl isoamyl ketone, methyl ethyl ketone, acetone Acetates: isopropyl acetate, n-butyl acetate, iso-butyl acetate, ethyl acetate, glycol ether acetates, isobutyl isobutyrate Aliphatics: heptanes, hexanes, vm&p naphtha, kerosene, mineral spirits Alcohols: amyl alcohols, methyl amyl alcohol, methanol, isopropyl alcohol, n-propyl alcohol, butanol, isobutanol, sec-butanol, ethanol, glycol ether solvents.

Some solvents having higher than 10% water solubility would be restricted in the final solvent blend not to exceed 10% by wt. of the solvent portion of the blend. Higher levels of water soluble components would tend to destabilize the emulsion and reduce performance by coupling water into the solvent phase.

Generally, the water component (B) can be any industrially acceptable water source, such as tap water. Desirably, the water is deionized or distilled water.

Suitable emulsifiers (C) are those that provide sufficient emulsification of the water into the oil continuous phase to establish a discontinuous water phase. Suitable emulsifiers are non-ionic and may contain alcohol functional end groups. The alcohol functional groups reduce paint defects from residual purge in the paint application system being included in applied paint by reacting into the paint. The emulsifiers must form primarily solvent continuous emulsions and resist emulsion inversion into water continuous emulsions. The emulsifier must not be too hydrophilic or the viscosity of the emulsion will be greater than 30 cps and water migration into the solvent phase will increase resulting in lower emulsion resistivity, poor stability and poor cleaning performance.

In one embodiment, the emulsifiers are nonionic surfactants, and may be various block copolymers having sufficient hydrophobic portions to associate with the continuous oil phase and sufficient hydrophilic portions to stabilize water micelles of the discontinuous phase. Desirably, the block copolymers are polyether polyols having an alcohol terminal group. In a preferred embodiment, an EO-PO-EO block copolymer has sufficient propylene oxide (PO) repeat units to solvate into the external solvent phase and enough ethylene oxide (EO) repeat units to create a stable association to the surface of water micelles. The polymer structure of EO-PO-EO restricts the length of the polymer dissolving into the solvent phase. This reduces drag effects or intermolecular interactions to keep the viscosity low even at high internal phase volumes. Another embodiment employs, PO-EO-PO block copolymers which tend to associate to the water droplet at the middle of the polymer molecule with the hydrophobic repeat units extending into the external phase. These types of hydrophobic—hydrophilic—hydrophobic polymer emulsifiers have greater intermolecular entanglement which can increase the viscosity of the emulsion more per unit of emulsifier than the EO-PO-EO polymer type. Control of the viscosity is important to commercial usefulness of paint line flushing cleaners used to remove un-cured paint from paint application delivery equipment. Examples of suitable emulsifiers include Atlox® from Uniqema, as well as Tetronic® and Pluronic® from BASF.

The water-in-oil emulsions of the invention may also comprise an emulsion stability additive (D) different from (A)-(C) above, which further stabilizes the dispersed water phase in the emulsion. Generally, ionic surfactants are used for this purpose with anionic surfactants being preferred. Selection of the surfactant depends on the final blend of solvents used. For emulsions based primarily on aromatic solvent, dioctyl sodium sulfosuccinate or 2-ethylhexyl sodium sulfosuccinate are preferred. The amount of anionic surfactant additives desirably is below 1% wt. to avoid emulsion inversion into a water continuous emulsion and water migration into the solvent phase lowering the emulsions resistivity and performance. Water-in-oil emulsions containing the anionic an emulsion stability additive can resist settling of the emulsified water particles after mixing.

The water-in-oil emulsions of the invention may also comprise (E) at least one paint compatibility additive and/or stabilizer different from (A)-(D). The paint compatibility additive serves to reduce or prevent paint defects. In one embodiment, an emulsion cleaner sprayed onto a panel, resulted in evaporation of any volatile solvent and most of the water which left low water soluble emulsifier and some water on the surface. The residual emulsifier and water caused cratering of the paint when the panels were coated. Suitable paint compatibility additives are those components that couple residual water in the paint equipment into any remaining solvent present, which then mixes into newly introduced paint or evaporates with any volatile solvent, thus preventing cratering. Suitable paint compatibility additives are water coupling materials desirably having a low vapor pressure (less than 0.4 mm Hg @ 20° C.). By way of non-limiting example, Aromatic 150 solvent and dipropylene glycol may be used alone or in combination as paint compatibility additives to eliminate paint compatibility issues. Without being bound by a single theory, the Aromatic 150 is thought to keep the emulsifier in a dissolved state and dipropylene glycol couples any phased out water into the Aromatic 150 solvent. The presence of dipropylene glycol appears to be useful in preventing paint defects. A coating of residual liquid from an emulsion cleaner according to the invention remaining on a test panel was easily solvated and dispersed when covered with atomized solvent-based paint. Low evaporating (less than 0.4 mm Hg @ 20° C.) solvents other than Aromatic 150 are also suitable as long as they can solvate the emulsifier. Alternative low evaporating coupling solvents other than dipropylene glycol may also be used.

The viscosity of the final emulsion cleaner should be as low as possible to maximize its turbulent flow during the cleaning operation. Turbulent flow is determined by calculating the Reynolds Number (RN) based on the following equation: $RN=pVD/u$, where $p$=fluid density; $V$=free stream fluid velocity; $D$=pipe diameter; and $u$=fluid viscosity (dynamic). In general, RN values of >3000 will be turbulent flow. When the viscosity of the emulsion cleaner is high, it causes the flow through the equipment to become laminar and thus hinders cleaning performance. High viscosity in an emulsion cleaner also hinders its removal from the delivery piping. This can result in a high level of cleaner mixing with the incoming paint to cause paint related quality issues. Desirably, viscosity of the water-in-solvent emulsion ranges from 2 cps to 30 cps, but can be as high as 50 cps for some applications. When the emulsion viscosity is greater than 100 cps, the cleaner performance is poor and the solution becomes difficult to push out of the paint application equipment between color changes.

It is desirable that the emulsion cleaner remains stable during turbulent flow through the paint application apparatus and tubing such that the emulsified discontinuous water phase is stably dispersed in the solvent phase during use in a working purge environment; that is, the two phases do not separate into layers and the emulsion does not invert to a solvent-in-water, aka oil-in-water, emulsion.

In one embodiment the invention comprises, preferably consists essentially of, most preferably consists of: a water-in-solvent emulsion having a solvent continuous phase and a discontinuous water phase, the emulsion comprising:

(A) about 30% to 90% by weight of one or more solvents, based on the total weight of the one or more solvents plus water, the solvents being selected such that no more than 10% wt. of the emulsion is comprised of organic solvents with a water-in-solvent solubility greater than 10% by wt. water;

(B) 10% to 70% by weight water, based on the total weight of the one or more solvents plus water;

(C) about 0.01 to 5% by weight of a non-ionic emulsifier having a solubility in water of less than in increasing order of preference 15, 14, 13, 12, 11, 10, 9, 8, 7, 6, 5% by weight and a molecular weight of greater than, in increasing order of preference, 1000, 1004, 1008, 1012, 1016, or 1020 g/mole.

(D) optionally 0.0 to 0.9% wt. anionic emulsion stability additives; and (E) optionally 0.0 to 5% wt. paint compatibility additives having less than 0.2 mm Hg @ 20° C. solvents, such as by way of non-limiting example aromatic based esters, ketones, and alcohols.

In one embodiment, having low Hazardous Air Pollutants (HAPs), the invention comprises preferably consists essentially of, most preferably consists of a water-in-oil emulsion having a solvent continuous phase and a discontinuous water phase, the emulsion comprising:

10-20% wt. isopropyl acetate or methyl propyl ketone
30-40% wt. Aromatic 100
0.0 to 7.0% wt. Aromatic 150
0.03 to 4.0% wt. a non-ionic emulsifier comprising at least one polyether polyol;
0.01 to 4.0% wt. dipropylene glycol
0.01 to 0.8% wt. an anionic surfactant
remainder water (DI water is preferred)

Another aspect of the invention is a method for preparing the water-in-oil emulsions of the invention comprising: mixing all of the ingredients except water together until dissolved. Using a propeller type mixing blade, add the water to the mixing solvent solution. In one embodiment, the emulsion system may be prepared by combining some or all of the organic or solvent soluble components into a premixed package, with or without the solvent and then combining with any remaining non-aqueous components followed by the water addition step.

The emulsion may be prepared in a ready to use working composition or may be prepared as a concentrate. The concentrate comprises all of the components except the water. If provided as a concentrate, an emulsifying apparatus, such as a product container with a mixing blade attached or a blending tank equipped with a mixer and metering devices for the water and concentrate, may be used to generate the water-in-oil emulsion by mixing the concentrate and water. Once the emulsion has been made, the cleaner may be provided to the purge supply system for use by pumping or the like. Most purge supply systems circulate the purge continuously, which can provide good stability.

In another embodiment, a two package concentrate can be used having a first package comprising a solvent or solvent blend and a second package comprising emulsifier. This embodiment requires two mixing steps, one to mix the emulsifier package with the solvent package followed by a second mixing step for addition of the water. Generally, this embodiment is useful when a concentrate combining the solvent and emulsifier is not suitable.

EXAMPLES

Example 1

This experiment evaluated the effects of adding water soluble solvents into an oil continuous water-in-solvent emulsion cleaner. The study also compared the performance of the emulsion cleaner to a 100% solvent based blend. Additional work from this study looked at the effects of various additives added to a solvent continuous emulsion cleaner.

Oil Continuous Emulsion Preparation Method:

Experimental Procedure: Mix all ingredients except water together. Using a propeller blade set at high RPM, slowly add the water phase. Continue mixing for 5 minutes before testing. Samples prepared were stored in 1 quart glass containers.

The following water-in-oil emulsion formulations were prepared:

TABLE 1

Emulsion Formulations

| ID | Xylene | MIBK | A-150 | Emulsifier A | Surfactant A | DPG | DI Water |
|---|---|---|---|---|---|---|---|
| 3200-145-A | 22.00% | 25.00% | 3.00% | 0.30% | 0.30% | 0.30% | 49.10% |
| 3200-150-B | 17.60% | 20.00% | 2.40% | 0.30% | 0.30% | 0.30% | 59.10% |
| 3200-150-C | 26.40% | 30.00% | 3.60% | 0.30% | 0.30% | 0.30% | 39.10% |
| 3200-150-D | 13.20% | 15.00% | 1.80% | 0.30% | 0.30% | 0.30% | 69.10% |
| 3200-150-E | 47.00% | 0.00% | 3.00% | 0.30% | 0.30% | 0.30% | 49.10% |

A-150 is Aromatic 150 commercially available from ExxonMobil; it is an aromatic hydrocarbon solvent comprising 0.1 to 9.9 wt. % naphthalene and 0.01 to 1.7 wt. % trimethylbenzene. It has a vapor pressure of 0.62 mmHg at 68° F., a solubility in water of less than 0.01 wt. % at 77° F. and a flashpoint of 145° F. (TCC ASTM D56).

MIBK is methyl isobutyl ketone, DPG is dipropylene glycol. Emulsifier A was a nonionic A-BA block copolymer surfactant having a maximum Hydroxyl Number of about 8.0 (mg KOH/g). The lipophilic A chains are polyhydroxystearic acid and the B hydrophilic part is polyethylene glycol. Surfactant A was an anionic surfactant described by the manufacturer as 70 wt % dioctyl sodium sulfosuccinate and 30% naphtha petroleum distillate.

Viscosity, resistivity and shelf stability were evaluated on all samples. The resistivity measure was performed using a Ransberg Resistivity Meter equipped with a submergible probe. Viscosity measurements were performed using a Brookfield viscometer and LV or RV selected spindles.

TABLE 2

Emulsion Properties

| Sample ID | Volume per purge cycle | Flow Rate $cm^3$/sec | Viscosity Purge at 72° F. (cps) | Reynolds # |
|---|---|---|---|---|
| 3200-145-A | 209 | 104.5 | 6.48 | 4671 |
| 3200-150-B | 188 | 94 | 11.4 | 2433 |
| 3200-150-C | 215 | 107.5 | 4.5 | 6766 |
| 3200-150-D | 150 | 75 | 110 | 204 |
| 3200-150-E | 206 | 103 | 7.32 | 4169 |
| Comparative Example 1 | 214 | 107 | 2.58 | 11379 |
| Comparative Example 1 | 68 | 34 | 2.58 | 3616 |

Comparative Example 1 was a 100% solvent blend made up of xylene, Aromatic 100, isopropyl alcohol, n-butyl acetate and n-butyl alcohol.

Test Method: Automated Purge Cycle Test

The equipment used to perform the purge cycle simulation is an actual electrostatic rotary atomized spray coating apparatus. The system consists of a controller equipped with microcomputer (i.e., CPU to provide motor rotation control), high speed type fiber-optic amplifier unit and fiber-optic cable. An air supply system with an electro-pneumatic transducer is used to control rotation speed of the air motor in the bell. The paint delivery system is equipped with a 4-stage color tree controlled pneumatically by the CPU. The solvent supply system is run using a 2.5:1 ratio Comet Hi-Volume pump. The system head pressure and backpressure are set to conditions that simulate the actual plant process. The hose length from the color tree to the fluid regulated was set at 10 feet, unless otherwise indicated. Paint was loaded through the equipment into the dump line using a paint load cycle of 10 seconds. One purge cycle was run to flush out the bulk of the loaded paint. The second purge cycle was collected from the dump line to determine the amount of residual paint not removed by the first purge cycle. The level of paint found in the $2^{nd}$ cycle indicates the efficiency of the cleaner tested. The more paint found in the second purge cycle sample per those conditions the worse the cleaner performed. The collected material was analyzed directly by determining the % wt. solids. The % wt. solids were performed by weighing 10 grams of sample then baking at 120° C. for 1.5 hours. Using the % wt. solids and the total volume of purge collected, the total mg of paint removed by the $2^{nd}$ consecutive purge cycle was calculated.

TABLE 3

Equipment Settings for Purge Cycle

| Pump Pressure Regulator Setting | Back Pressure Regulator setting | High Air Pressure Setting | Hose Length from Color Tree to Fluid Regulator | Hose ID from color changer to bell atomizer | Paint |
|---|---|---|---|---|---|
| 80 psi | 90 psi | 80 psi | 3 feet | ⅛ inch ID | DuPont Primer |

TABLE 4

Purge Cycle Work Sheet

| PURGE CYCLE | 1 | 2 | 3 | 4 | 5 | 6 | 7 | 8 | 9 | 10 |
|---|---|---|---|---|---|---|---|---|---|---|
| Main Solvent | 0 | 1 | 0 | 1 | 0 | 1 | 0 | 1 | 0 | 0 |
| HP Air | 1 | 0 | 1 | 0 | 1 | 0 | 1 | 0 | 1 | 1 |
| HP Fill | 1 | 1 | 1 | 1 | 1 | 1 | 1 | 1 | 1 | 1 |
| Dump | 1 | 1 | 1 | 1 | 1 | 1 | 1 | 1 | 1 | 1 |
| Bell Solvent | 0 | 0 | 0 | 0 | 0 | 0 | 0 | 0 | 0 | 0 |
| Bell Air | 0 | 0 | 0 | 0 | 0 | 0 | 0 | 0 | 0 | 0 |
| NF Solvent | 0 | 0 | 0 | 0 | 0 | 0 | 0 | 0 | 0 | 0 |
| NF Air | 0 | 0 | 0 | 0 | 0 | 0 | 0 | 0 | 0 | 0 |

0 = off, 1 = on, on time per section = 0.5 seconds

The water-in-oil emulsion formulations of Table 1, plus a 100% solvent Comparative Example 1, were evaluated using the automatic purge cycle test. The purge cycle and equipment settings are listed in Tables 3 and 4. The purge cycle timing was altered to evaluate the cleaning performance as the volume per purge cycle was increased. An acetone purge was used between samples.

Sample Analysis Procedure:

All purge samples collected were sonicated for at least 5 minutes to disperse any paint into solution. The emulsion samples were diluted into ethyl lactate to couple the water into a clear solution prior to measuring the turbidity value. Final turbidity values were adjusted based on the dilution factor. A summary of the testing is shown in the table below.

TABLE 5

Results Summary using 3 feet of Hose Length

| Sample ID # | Purge Cycle Sequence collected | Total % wt. Solvent | Purge Volume in ml Per cycle | Purge Temperature in ° F. | Adjusted Turbidity Value in NTU's |
|---|---|---|---|---|---|
| 3200-145-A | 2 | 50% | 209 | 75 | 2087 |
| 3200-150-C | 2 | 60% | 215 | 75 | 1305 |
| 3200-150B | 2 | 40% | 188 | 75 | 2370 |
| 3200-150D | 2 | 30% | 150 | 75 | 2346 |
| 3200-150-E | 2 | 50% | 206 | 75 | 2058 |
| Comparative Example 1 | 2 | 100% | 214 | 75 | 1939 |

Table 5 shows that using a 50% wt. solvent, water-in-oil emulsion cleaner can achieve similar performance to a 100% wt. solvent blend (Comparative Example 1). Using a 60% wt. solvent formulation, exceeded the cleaning performance of the 100% solvent blend. The 30% wt. and 40% wt. solvent blends performed only slightly less effectively than the 100% solvent blend.

Example 2

Water-in-oil emulsion cleaners were produced according to the procedure of Example 1 using the components listed in the table below:

TABLE 6

Emulsion Formulations

| ID | IPAc | MPK | A-100 | A-150 | Emulsifier A | Surfactant A | DPG | DI Water |
|---|---|---|---|---|---|---|---|---|
| 3266-127-S | 15.0% | | 33.0% | 2.0% | 0.3% | 0.2% | 0.2% | 49.1% |
| 3266-127-T | | 15.0% | 33.0% | 2.0% | 0.3% | 0.2% | 0.2% | 49.1% |

IPAc is isopropyl acetate, MPK is methyl propyl ketone. A-100 is Aromatic 100 commercially available from Exxon-Mobil; it is an aromatic hydrocarbon solvent comprising 0.01 to 32 wt. % trimethylbenzene, 0.01 to 2.2 wt. % xylene and 0.01 to 1.5 wt. % cumene. It has a vapor pressure of 2.09 mmHg at 68° F., a solubility in water of 0.02 wt. % at 77° F. and a flashpoint of 108° F. (TCC ASTM D56).

Solvent Performance Drop Test Procedure I

Using a draw down square, apply four mils of wet paint to a glass panel. Place the glass panel at a 45-degree angle. Allow the panels to flash dry for up to 5 minutes. From a pipette, drop drops of test sample onto the panel at a rate of 1 drop per second. Each drop must contact the panel at the same point. Panels are rated according to how much paint was removed.

The compositions of Table 6 were tested using Solvent Performance Drop Test Procedure I. Comparative testing was done using Methyl Ethyl Ketone (MEK) and Comparative Example 2, a 100% solvent blend based on Aromatic 100, Isopropyl alcohol, Heptane and Acetone. The results are shown in the table below:

TABLE 7

Results Solvent Performance Drop Test

| Paint | Product | Paint Thickness | Drops to clean | Solvent Temp | Paint removal |
|---|---|---|---|---|---|
| PPG SB-type TKPS8554 GM White | Comparative Example 2 | 2 mils | 20 | 77° F. | 25% |
| | MEK | 2 mils | 20 | 77° F. | 20% |
| | 3266-127-S | 2 mils | 15 | 77° F. | 100% |
| | 3266-127-T | 2 mils | 15 | 77° F. | 100% |

Comparative Example 2 and MEK left a significant level of white precipitated pigment on the surface of the panel. The water in oil emulsions 3266-127-S and 3266-127-T removed 100% of the paint leaving no residual pigment on the cleaned area. This experiment demonstrates the enhanced cleaning strength of these emulsion based cleaners at a 50% reduced solvent level.

Example 3

Performance of water-in-oil emulsion cleaners on solvent-based paint at elevated operating temperatures with and without the addition of an alkalinity source was tested. Water-in-oil emulsion cleaners were produced according to the procedure of Example 1 using the components listed in Table 8. The properties of the formulations of Table 8 are shown in Table 9.

TABLE 8

| ID | Xylene | A-100 | MAK | MPK | n-BAc | MEA | DI water |
|---|---|---|---|---|---|---|---|
| 3266-46-A | | 33.00% | 15.00% | | | | 49.35% |
| 3266-46-B | | 40.00% | | | 8.00% | | 49.35% |
| 3266-43-A | 38.00% | | | 20.00% | | | 39.35% |
| 3266-43-B | 38.00% | | | 20.00% | | 1.00% | 38.35% |

Each Formulation of Table 8 also contained 2.00 wt % A-150, 0.30% Emul. A, 0.15% Surf. A, and 0.20% DPG.

MAK is Methyl-n-Amyl Ketone, n-BAc is n-Butyl Acetate and MEA is monoethanolamine.

TABLE 9

Emulsion Properties

| ID | LV Viscosity Spindle #1, 100 RPM cps | RV Viscosity Spindle #1, 50 RPM cps | Resistivity via probe method, Mohms |
|---|---|---|---|
| 3266-46-A | 6.54 | 14.87 | 0.3 |
| 3266-46-B | 6.91 | 16.21 | 8.1 |
| 3266-43-A | 3.01 | 6.28 | 0.1 |
| 3266-43-B | 3.91 | 8.81 | 0.1 |

The water-in-oil emulsion formulations of Table 8 were evaluated using the Automated Purge Cycle Test of Example 1. The purge cycle and equipment settings are listed in Tables 10 and 11. The purge cycle timing was altered to evaluate the cleaning performance as the volume per purge cycle was increased. An acetone purge was used between samples.

TABLE 10

Equipment Settings for Purge Cycle

| Pump Pressure Regulator Setting/ Head Fluid Pressure Setting | Back Pressure Regulator Setting | High Pressure Air Setting | Hose Length from Color Tree to Fluid Regulator | Hose ID from color changer to bell atomizer | Paint |
|---|---|---|---|---|---|
| 65 psi/ 130 psi | 95 psi | 90 psi | 10 feet | ⅛ inch ID | Reaction Blue (Metallic BC) |

TABLE 11

Purge Cycle Work Sheet

| PURGE CYCLE | 1 | 2 | 3 | 4 | 5 | 6 | 7 | 8 | 9 | 10 |
|---|---|---|---|---|---|---|---|---|---|---|
| Main Solvent | 0 | 0 | 0 | 1 | 1 | 1 | 1 | 0 | 0 | 0 |
| HP Air | 1 | 1 | 1 | 0 | 0 | 0 | 0 | 1 | 1 | 1 |
| HP Fill | 1 | 1 | 1 | 1 | 1 | 1 | 1 | 1 | 1 | 1 |
| Dump | 1 | 1 | 1 | 1 | 1 | 1 | 1 | 1 | 1 | 1 |
| Bell Solvent | 0 | 0 | 0 | 0 | 0 | 0 | 0 | 0 | 0 | 0 |
| Bell Air | 0 | 0 | 0 | 0 | 0 | 0 | 0 | 0 | 0 | 0 |
| NF Solvent | 0 | 0 | 0 | 0 | 0 | 0 | 0 | 0 | 0 | 0 |
| NF Air | 0 | 0 | 0 | 0 | 0 | 0 | 0 | 0 | 0 | 0 |

0 = off, 1 = on, on time per section = Varied the time

The Sample Analysis Procedure of Example 1 was used to prepare and test the formulations. A summary of the test results is shown in the tables below.

TABLE 12

Results Summary

| Sample ID # | Purge Cycle Sequence collected | Purge Cycle Time Interval in seconds | Purge Volume in ml Per cycle | Purge Temperature in ° F. | Total mg paint in 2nd purge cycle |
|---|---|---|---|---|---|
| 3266-46-A | 2 | 0.5 | 128 | 75 | 301 |
| 3266-46-A | 2 | 0.7 | 165 | 75 | 127 |
| 3266-46-A | 2 | 0.9 | 205 | 75 | 74 |
| 3266-46-A | 2 | 0.5 | 133 | 100 | 241 |
| 3266-46-A | 2 | 0.7 | 173 | 100 | 89 |
| 3266-46-A | 2 | 0.9 | 214 | 100 | 35 |

Table 12.0 demonstrates that increasing the temperature from 75 to 100° F. reduced the residual paint collected in the second purge cycle by 20% for a purge volume per cycle of 128-133 ml to 52% for a purge volume per cycle of 205-214 ml. The increased heat on the cleaner increases the system's vapor pressure and thus increases the system's kinetic energy. In general, higher vapor pressure solvents will dissolve faster than lower vapor pressure solvents. The formulation 3266-46-A was formulated to have a flash point of 100° F. to 110° F. and a 50% wt. solvent loading level.

TABLE 13

Results Summary

| Sample ID # | Purge Cycle Sequence collected | Purge Cycle Time Interval in seconds | Purge Volume in ml Per cycle | Purge Temperature in ° F. | Total mg paint in 2nd purge cycle |
|---|---|---|---|---|---|
| 3266-46-B | 2 | 0.5 | 127 | 75 | 340 |
| 3266-46-B | 2 | 0.7 | 165 | 75 | 165 |
| 3266-46-B | 2 | 0.9 | 205 | 75 | 100 |
| 3266-46-B | 2 | 0.5 | 135 | 100 | 262 |
| 3266-46-B | 2 | 0.7 | 175 | 100 | 119 |
| 3266-46-B | 2 | 0.9 | 215 | 100 | 52 |

Table 13.0 demonstrates the same effect as Table 12.0 but uses a slightly different solvent blend. Increasing the heat from 75 to 100° F. reduced the residual paint collected in the second purge cycle by 22% for a purge volume per cycle of 127-135 ml to 48% for a purge volume per cycle of 205-215 ml. The formulation 3266-46-B was formulated to have a flash point of 100° F. to 110° F. and a 50% wt. solvent loading level.

TABLE 14

Results Summary

| Sample ID # | Purge Cycle Sequence collected | Purge Cycle Time Interval in seconds | Purge Volume in ml Per cycle | Purge Temperature in ° F. | Total mg paint in 2nd purge cycle |
|---|---|---|---|---|---|
| 3266-43-A | 2 | 0.5 | 133 | 75 | 208 |
| 3266-43-A | 2 | 0.7 | 175 | 75 | 72 |
| 3266-43-A | 2 | 0.9 | 215 | 75 | 43 |
| 3266-43-B | 2 | 0.5 | 137 | 75 | 153 |
| 3266-43-B | 2 | 0.7 | 180 | 75 | 81 |
| 3266-43-B | 2 | 0.9 | 220 | 75 | 60 |

Table 14.0 compared the difference of adding 1% wt. monoethanolamine to the base formulation of a 60% wt. based solvent blend emulsion. The additional monoethanolamine showed an improvement at the 133 to 137 ml purge cycle volume but equivalent performance for higher volume purge cycles tested.

Example 3

This experiment further evaluated the effects of adding water soluble solvents into the oil continuous solvent emulsion cleaner. The study also compared the performance of the emulsion cleaner to a 100% solvent blend. Additional work from this study looked at the effects of various additives added to a water-in-oil emulsion cleaner.

Water-in-oil emulsion cleaners were produced according to the procedure of Example 1 using the components listed in Table 15. Each Formulation of Table 15 contained 0.30% Emul. A, 0.30% Surf. A, and 0.30% DPG. All Formulations of Table 15 contained 20.00% MPK and 36.40% xylene, except Formulation 3266-31-F which contained 46.00% xylene and no MPK. The formulations of Table 15 had the properties shown in Table 16.

TABLE 15

| ID | A-150 | IPAc | NH$_4$OH | MEA | D-111 | D-116 | D-184 | CaCO$_3$ | IPA | DI Water |
|---|---|---|---|---|---|---|---|---|---|---|
| 3266-31-A | 2.60% | | | | | 2.00% | | | | 38.10% |
| 3266-31-B | 2.60% | | | | 2.00% | | | | | 38.10% |
| 3200-172-B | 3.60% | | | | | | | | | 39.10% |
| 3266-31-C | 3.60% | | | | | | | 0.20% | 5.00% | 38.90% |

TABLE 15-continued

| ID | A-150 | IPAc | NH$_4$OH | MEA | D-111 | D-116 | D-184 | CaCO$_3$ | IPA | DI Water |
|---|---|---|---|---|---|---|---|---|---|---|
| 3266-31-D | 3.60% | | | 1.00% | | | | | | 38.10% |
| 3266-31-E | 3.60% | | 1.00% | | | | | | | 38.10% |
| 3266-31-F | 3.00% | 7.00% | | | | | | | 5.00% | 38.10% |

Dispersants D-111, D-116 and D-184 are functionalized polymer dispersants. IPA is isopropyl alcohol.

TABLE 16

| | LV Viscosity Spindle #1, 100 RPM (cps) | RV Viscosity Spindle #1, 50 RPM (cps) | Ransberg Resistivity |
|---|---|---|---|
| ID | | | |
| 3266-31-A | 4.26 | 11.92 | 16 Kohms |
| 3200-172-B | 4.14 | 11.25 | 18 Kohms |
| 3266-31-D | 3.9 | 10.36 | 27 Kohms |
| 3266-31-E | 3.84 | 11.14 | 15 Kohms |
| 3266-31-F | 4.8 | 12.23 | 4.2 Mohms |

The water-in-oil emulsion formulations of Table 15 were evaluated using the automatic purge cycle test. The purge cycle and equipment settings are listed in Table 17 and 18. The purge cycle timing was altered to evaluate the cleaning performance as the volume per purge cycle was increased. An acetone purge was used between samples.

TABLE 17

Equipment Settings for Purge Cycle

| Pump Pressure Regulator Setting/ Head Fluid Pressure Setting | Back Pressure Regulator Setting | High Pressure Air Setting | Hose Length from Color Tree to Fluid Regulator | Hose ID from color changer to bell atomizer | Paint |
|---|---|---|---|---|---|
| 80 psi/ 130 psi | 95 psi | 90 psi | 10 feet | ⅛ inch ID | DuPont Silver Basecoat |

TABLE 18

The purge cycle settings were the same as those shown in Table 11

| PURGE CYCLE | 1 | 2 | 3 | 4 | 5 | 6 | 7 | 8 | 9 | 10 |
|---|---|---|---|---|---|---|---|---|---|---|

The Sample Analysis Procedure of Example 1 was used to prepare and test the formulations. A summary of the test results is shown in Table 19, which shows the performance difference of a blend containing 5% Isopropyl alcohol (3266-31-F) versus a non alcohol based blend 3200-172-B. The non alcohol based blend showed a 51% reduction in residual paint on the second purge collected for a 115 ml based purge cycle. Although, the alcohol containing purge still removed and solvated the paint, its performance was significantly reduced.

TABLE 19

Results Summary

| ID # | Purge Cycle Sequence collected | Purge Cycle Time Interval in seconds | Purge Volume in ml Per cycle | Purge Temperature in ° F. | Total mg paint in 2nd purge cycle |
|---|---|---|---|---|---|
| 3266-31-F | 2 | 0.4 | 115 | 75 | 489 |
| 3266-31-F | 2 | 0.5 | 137 | 75 | 183 |
| 3266-31-F | 2 | 0.7 | 205 | 75 | 66 |
| 3266-172-B | 2 | 0.4 | 115 | 75 | 237 |
| 3266-172-B | 2 | 0.5 | 132 | 75 | 107 |
| 3266-172-B | 2 | 0.7 | 180 | 75 | 53 |

Table 20.0 shows the performance of a 100% solvent blend Comparative Example 1 versus a 60% solvent emulsion cleaner 3200-172-B using a 10 foot hose length. Although better at the shorter purge volume per cycle, the performance is equivalent at the 180 to 185 ml purge volume per purge cycle.

TABLE 20

Results Summary

| ID # | Purge Cycle Sequence collected | Purge Cycle Time Interval in seconds | Purge Volume in ml Per cycle | Purge Temperature in ° F. | Total mg paint in 2nd purge cycle |
|---|---|---|---|---|---|
| Comparative Example 1 | 2 | 0.4 | 118 | 75 | 149 |
| Comparative Example 1 | 2 | 0.5 | 140 | 75 | 77 |
| Comparative Example 1 | 2 | 0.7 | 185 | 75 | 43 |
| 3200-172-B | 2 | 0.4 | 115 | 75 | 237 |
| 3200-172-B | 2 | 0.5 | 132 | 75 | 107 |
| 3200-172-B | 2 | 0.7 | 180 | 75 | 53 |

The formulations of Example 3 evaluated the performance of similar formulas spiked with various additives. Dispersant 116, monoethanolamine and Ammonium Hydroxide were evaluated in similar base formulations. The Disperbyk 116 and Ammonium Hydroxide samples showed slightly less performance than the control 3200-172-B. The monoethanolamine showed a slight improvement over the base formulation 3200-172-B.

Example 4

This experiment further defined the structural relationship of emulsifiers that have the ability to maintain stable water-in-oil emulsions in systems based on solvents with high vapor pressure. Several surfactants based on ABA polymeric structures of EO and PO were evaluated in a typical solvent continuous phase formulation. Performance was based on the emulsions' ability to produce a stable water-in-oil phase over time with minimal water separation, low viscosity and high resistivity. The control emulsifier used for this study was Emulsifier A from Examples 1-3.

TABLE 21

Emulsifier Characteristics

| ID | Approximate Structure | HLB | MW | Cloud Point @1% in DI water |
|---|---|---|---|---|
| Emulsifier A | (hydroxystearic acid ester)$_4$ (EO)$_{10}$ (hydroxystearic acid ester)$_4$ | 1 | 2832 | Insoluble |
| Emulsifier B | (EO)$_6$(PO)$_{67}$(EO)$_6$ | 1 | 4400 | 14° C. |
| Emulsifier C | (EO)$_7$(PO)$_{54}$(EO)$_7$ | 1 | 3800 | 15° C. |
| Emulsifier D | ((PO)$_{31}$(EO)$_4$)$_2$—N—CH$_2$—CH$_2$—N-((EO)$_4$(PO)$_{31}$)$_2$ | 1 | 8000 | 20° C. |
| Emulsifier E | (PO)$_{23}$(EO)$_7$(PO)$_{21}$ | 1 | 3250 | 25° C. |
| Emulsifier F | (EO)$_6$(PO)$_{39}$(EO)$_6$ | 2 | 2750 | 20° C. |
| Emulsifier G | ((EO)$_2$(PO)$_{14}$)$_2$—N—CH$_2$—CH$_2$—N—((PO)$_{14}$(EPO)$_2$)$_2$ | 3 | 3600 | 18° C. |
| Emulsifier H | ((EO)$_3$(PO)$_{18}$)$_2$—N—CH$_2$—CH$_2$—N—((PO)$_{18}$(EPO)$_3$)$_2$ | 3 | 4700 | 20° C. |
| Emulsifier I | (EO)$_3$(PO)$_{30}$(EO)$_3$ | 3 | 2000 | 24° C. |
| Emulsifier J | (PO)$_{18}$(EO)$_{14}$(PO)$_{18}$ | 4 | 3100 | 29° C. |
| Emulsifier K | (EO)$_{10}$(PO)$_{47}$(EO)$_{10}$ | 6 | 3650 | 26° C. |
| Emulsifier L | (EO)$_8$(PO)$_{32}$(EO)$_8$ | 7 | 2500 | 32° C. |
| Emulsifier M | (EO)$_{21}$(PO)$_{67}$(EO)$_{21}$ | 8 | 5750 | 90° C. |
| Emulsifier N | (EO)$_{20}$(PO)$_{54}$(EO)$_{20}$ | 9 | 4950 | 86° C. |
| Emulsifier O | (PO)$_{12}$(EO)$_{23}$(PO)$_{12}$ | 12 | 2650 | 46° C. |
| Emulsifier P | (PO)$_{15}$(EO)$_{155}$(PO)$_{15}$ | 13 | 8550 | 45° C. |
| Emulsifier Q | (EO)$_{31}$(PO)$_{54}$(EO)$_{31}$ | 13 | 5900 | 81° C. |

Emulsifier B was a B-A-B nonionic polyoxypropylene polyoxyethylene block copolymer having a hydroxyl number of about 24.0-27.0 (mg KOH/g) and a pH, at 2.5% aqueous of about 6.0-7.4. The lipophilic A chain is a polypropylene glycol and the B hydrophilic part is polyethylene glycol. MW was 3600±400.

Water-in-oil emulsion cleaners were produced according to the procedure of Example 1 using the components listed in the Tables 22 and 23. Each Formulation of Tables 22 and 23 contained 33.0% Xylene, 15.0% IPAc, 2.0% A-150, 0.2% Surfactant A, and 0.2% DPG

TABLE 22

Emulsion Formulations

| ID | Emulsifier A | E | P | O | C | D | J | I | F | DI Water |
|---|---|---|---|---|---|---|---|---|---|---|
| 3266-127-A | 0.3% | | | | | | | | | 49.4% |
| 3266-127-B | | 0.6% | | | | | | | | 49.1% |
| 3266-127-C | | | 0.6% | | | | | | | 49.1% |
| 3266-127-D | | | | 0.6% | | | | | | 49.1% |
| 3266-127-E | | | | | 0.6% | | | | | 49.1% |
| 3266-127-F | | | | | | 0.6% | | | | 49.1% |
| 3266-127-G | | | | | | | 0.6% | | | 49.1% |
| 3266-127-H | | | | | | | | 0.6% | | 49.1% |
| 3266-127-I | | | | | | | | | 0.6% | 49.1% |

TABLE 23

Emulsion Formulations

| ID | B | G | H | L | K | N | Q | M | DI Water |
|---|---|---|---|---|---|---|---|---|---|
| 3266-127-J | 0.6% | | | | | | | | 49.1% |
| 3266-127-K | | 0.6% | | | | | | | 49.1% |
| 3266-127-L | | | 0.6% | | | | | | 49.1% |
| 3266-127-M | | | | 0.6% | | | | | 49.1% |
| 3266-127-N | | | | | 0.6% | | | | 49.1% |
| 3266-127-O | | | | | | 0.6% | | | 49.1% |
| 3266-127-P | | | | | | | 0.6% | | 49.1% |
| 3266-127-Q | | | | | | | | 0.6% | 49.1% |

The formulations of Tables 22 and 23 had the properties shown in Table 24.

TABLE 24

Emulsion Properties

| ID | LV Viscosity Spindle #1, 100 RPM cps | RV Viscosity Spindle #1, 50 RPM cps | Resistivity via probe method in Mohms | Al Coupon Resistivity in Mohms | Emulsion Type observed after 1 hour | Stability after 4 days at Rest |
|---|---|---|---|---|---|---|
| 3266-127-A | 7.02 | 15.58 | 2 | 18.2 | Water in Oil | Good. No water |
| 3266-127-B | 16.26 | 18.25 30% RPM | 0.004 | 0.007 | Oil in Water | >30% water separation |
| 3266-127-C | 16.2 | 23.84 30% RPM | 0.003 | 0.007 | Oil in Water | >30% water separation |
| 3266-127-D | 10.74 | 18.84 30% RPM | 0.003 | 0.007 | Oil in Water | >30% water separation |
| 3266-127-E | 6.72 | 13.29 | 1 | 24.7 | Water in Oil | >30% water separation. Emulsion inverted to Oil in Water upon shaking after 24 hours. |
| 3266-127-F | 7.2 | 14.68 | 0.068 | 9.1 | Water in Oil | Good. Less than 1% volume water separation. |
| 3266-127-G | 46.2 | 31.41 20% RPM | 0.005 | 0.011 | Oil in Water | >30% water separation. Emulsion inverted to Oil in Water upon shaking. |
| 3266-127-H | 75.6 | 19.81 30% RPM | 0.002 | 0.006 | Oil in Water | >30% water separation. Emulsion inverted to Oil in Water upon shaking. |
| 3266-127-I | 69 | 22.2 30% RPM | 0.002 | 0.006 | Oil in Water | >30% water separation. Emulsion inverted to Oil in Water upon shaking. |
| 3266-127-J | 7.2 | 13.4 | 1.2 | 10.5 | Water in Oil | Good. 2% volume water separation. |
| 3266-127-K | 14.88 | 22.75 30% RPM | 0.002 | 0.006 | Oil in Water | >30% water separation. Emulsion inverted to Oil in Water upon shaking. |
| 3266-127-M | 12.18 | 20.44 30% RPM | 0.002 | 0.007 | Oil in Water | >30% water separation. Emulsion inverted to Oil in Water upon shaking. |
| 3266-127-N | 6.84 | 17.01 | 0.031 | 0.8 Mohms | Water in Oil | Good. No water |
| 3266-127-O | 49.44 | | 0.012 | 0.16 | Water in Oil | Good. No water |
| 3266-127-P | 598 10% RPM | | 0.015 | 0.161 | Water in Oil | Good. No water |
| 3266-127-Q | 326 10% RPM | | 0.025 | 0.533 | Water in Oil | Good. No water |

The stability of the emulsions produced in Example 4 was evaluated as a function of emulsifier characteristics:

TABLE 25

Emulsion Stability

| ID | Emulsifier Approximate Structure | Emul. HLB | Molecular wt. | PO Length moles | EO Length moles | Stable water in oil emulsions |
|---|---|---|---|---|---|---|
| 3266-127-H | $(EO)_3(PO)_{30}(EO)_3$ | 3 | 2000 | 30 | 3 | No |
| 3266-127-M | $(EO)_8(PO)_{32}(EO)_8$ | 7 | 2500 | 32 | 8 | No |
| 3266-127-I | $(EO)_6(PO)_{39}(EO)_6$ | 2 | 2750 | 39 | 6 | No |
| 3266-127-N | $(EO)_{10}(PO)_{47}(EO)_{10}$ | 6 | 3650 | 47 | 8 | Yes |
| 3266-127-E | $(EO)_7(PO)_{54}(EO)_7$ | 1 | 3800 | 54 | 7 | Short Term only, <24 hours stability |
| 3266-127-O | $(EO)_{20}(PO)_{54}(EO)_{20}$ | 9 | 4950 | 54 | 20 | Yes |
| 3266-127-P | $(EO)_{31}(PO)_{54}(EO)_{31}$ | 13 | 5900 | 54 | 31 | Yes |
| 3266-127-J | $(EO)_6(PO)_{67}(EO)_6$ | 1 | 4400 | 67 | 6 | Yes |
| 3266-127-Q | $(EO)_{21}(PO)_{67}(EO)_{21}$ | 8 | 5750 | 67 | 21 | Yes |

The above data indicates that the molecular weight, the amount of PO and amount of EO (ethylene oxide) groups on either side of the EO-PO-EO polymer has an impact on the formation of a stable water in oil emulsion. The most stable emulsifier found thus far is Emulsifier A.

Stability is not the only feature examined in making an effective purge. The table below compares the viscosities and resistivity for the above formulations that formed stable water in oil emulsions.

TABLE 26

Emulsion Viscosity and Resistivity

| ID | Emulsifier Approximate Structure | Emul. HLB | EO Length moles | MW | Resistivity with Rhansburg Probe | Emulsion Viscosity LV#1(cps @ 75 F |
|---|---|---|---|---|---|---|
| 3266-127-E | $(EO)_4(PO)_{59}(EO)_4$ | 1 | 7 | 3800 | 1.0 Mohms | 6.72 |
| 3266-127-N | $(EO)_{10}(PO)_{47}(EO)_{10}$ | 6 | 8 | 3650 | .016 Mohms | 6.84 |
| 3266-127-J | $(EO)_6(PO)_{67}(EO)_6$ | 1 | 6 | 4400 | 1.2 Mohms | 7.2 |

TABLE 26-continued

Emulsion Viscosity and Resistivity

| ID | Emulsifier Approximate Structure | Emul. HLB | EO Length moles | MW | Resistivity with Rhansburg Probe | Emulsion Viscosity LV#1(cps @ 75 F |
|---|---|---|---|---|---|---|
| 3266-127-O | $(EO)_{20}(PO)_{54}(EO)_{20}$ | 9 | 20 | 4950 | 0.012 Mohms | 49.44 |
| 3266-127-Q | $(EO)_{21}(PO)_{67}(EO)_{21}$ | 8 | 21 | 5750 | 0.025 Mohms | 326 |
| 3266-127-P | $(EO)_{31}(PO)_{54}(EO)_{31}$ | 13 | 31 | 5900 | 0.015 Mohms | 598 |

The length of the ethylene oxide repeat unit has a significant impact on the viscosity and resistivity of the emulsion system. EO units of 4 to 8 in length, produced optimal viscosities <8 cps and resistivities > or =1.0 Mohms with the exception of 3266-127-N. Samples prepared with EO-PO-EO emulsifiers having 17 or greater EO repeat units on each side of the ABA polymer produced 7 to 84 times higher viscosities and 40 to 83 times lower resistivity values. The 3266-127-O, 3266-127-P, and 3266-127-Q emulsions upon shaking after 24 hours produced large chunky white particles. Some of these large particles were big enough not to pass through a 1 um filter bag.

To produce an effective purge solution, the viscosity must be as low as possible to achieve turbulent flow and allow for easy removal during a paint load cycle. Those samples with viscosities greater than 30 cps would be less preferred than lower viscosity cleaners.

Resistivity is only an issue on certain types of equipment but it is desirable that the cleaners have resistivity values of greater than 0.1 to 0.3 Mohms. There also appears to be a correlation to low resistivity values and poor emulsion stability.

Emulsifier D is based on an ethylene diamine with 4 repeat units of EO each caped with 31 PO repeat units. This sample also produced a stable emulsion with only low levels of water separation after 4 days at rest. In contrast, Emulsifier G contains an alkoxylated diamine with 14 repeat units of PO each capped with 2 moles EO on each chain but did not produce stable water in oil emulsions. The ethylene diamine alkoxylated surfactants produced a stable water in oil emulsion with the PO capped products; whereas, the ABA alkoxylates produced a stable emulsion with the EO capped products.

Example 5

Water-in-oil emulsion cleaners were produced using the components listed in Tables 27 and 28 according to the method of Example 1, except mixing was for 10 minutes. Each Formulation of Table 27 contained 0.30% DPG. All Formulations of Table 27 contained 25.00% A-100, 0.50% Emulsifier A and 25.00% IPAc, except Formulation 3200-107-A which contained 0.30% Emulsifier A, 16.00% IPAc and no A-100. The solutions were measured for viscosity then poured into a 500 ml graduated cylinder. 350 ml of the samples were allowed to dwell before withdrawing the bottom 150 ml for viscosity analysis using a Brookfield Viscometer.

TABLE 27

Emulsion Formulations

| Components | ID 3200-129-A | ID 3200-129-B | ID 3200-129-C | ID 3200-129-D | ID 3200-129-E | ID 3200-107-A |
|---|---|---|---|---|---|---|
| Xylene | | | | | | 20.00% |
| n-butyl alcohol | | | | | | 4.00% |
| Surfactant A1 | 0.50% | | | | | |
| Surfactant A2 | | 0.80% | | | | |
| Surfactant A | | | 0.50% | | | |
| Surfactant A3 | | | | 0.45% | | |
| Surfactant A4 | | | | | 0.50% | |
| DI Water | 48.70% | 48.40% | 48.70% | 48.75% | 48.70% | 59.40% |
| Total | 100.00% | 100.00% | 100.00% | 100.00% | 100.00% | 100.00% |
| Test Results | | | | | | |
| Directly after mixing Viscosity (cps) Spindle#1 LV, 100 RPM | 7.8 cps | 7.74 cps | 8.04 cps | 7.68 cps | 6.72 cps | 22.38 |
| Resistivity Probe Mohms | 0.6 | 40 | 3.1 | 5.4 | 2.9 | 3 |
| Resistivity Al Coupon Method Mohms | 10 | 170 | 20 | 20 | 20.1 | 105 |
| Viscosity (cps) Spindle#1 LV, 100 RPM @ 4 hours of dwell time. Bottom 150 ml | 10.39 cps | 21.0 cps | 8.88 cps | 13.69 cps | 9.36 cps | 41.52 |
| Viscosity (cps) Spindle#1 LV, 100 RPM @ 10 days of dwell time. Bottom 150 ml | 60.9 cps | 278 cps | 73.5 cps | 111.9 cps | 21.0 cps | 318 cps |

Surfactant A1 was an anionic hydrophobic surfactant described by the manufacturer as sodium bistridecyl sulfosuccinate. Surfactant A2 was an anionic hydrophilic surfactant described by the manufacturer as sodium diisobutyl sulfosuccinate. Surfactant A3 was an anionic surfactant described by the manufacturer as sodium dihexyl sulfosuccinate. Surfactant A4 was an anionic surfactant described by the manufacturer as sodium 2-ethyl hexyl sulfosuccinate.

Each Formulation of Table 28 contained 0.30% DPG, 35.00% A-100, 0.50% Emulsifier A and 15.00% IPAc.

TABLE 28

Emulsion Formulations

| Components | ID 3200-129-A | ID 3200-129-B | ID 3200-129-C | ID 3200-129-D | ID 3200-129-E |
|---|---|---|---|---|---|
| Surfactant A1 | 0.50% | | | | |
| Surfactant A2 | | 0.80% | | | |
| Surfactant A | | | 0.50% | | |
| Surfactant A3 | | | | 0.45% | |
| Surfactant A4 | | | | | 0.50% |
| DI Water | 48.70% | 48.40% | 48.70% | 48.75% | 48.70% |
| Total | 100.00% | 100.00% | 100.00% | 100.00% | 100.00% |
| Test Results | | | | | |
| Viscosity (cps) Spindle #1 LV, 100 RPM | 8.1 cps | 7.3 cps | 8.8 cps | 8.3 cps | 7.3 cps |
| Resistivity Probe Mohms | 0.6 | 40 | 3.1 | 5.4 | 2.9 |
| Resistivity A1 Coupon Method Mohms | 10 | 170 | 20 | 20 | 20.1 |
| Stability @ 3 day dwell Time | 10% vol. Top phase separation. Opaque. No water separation | 36% vol. Top phase separation. Opaque. No water separation. | 35% vol. Top phase separation. Opaque. No water separation. | 42% vol. Top phase separation. Opaque. No water separation. | 43% vol. Top phase separation. Opaque. No water separation. |

The higher Aromatic 100 ratio to IPAc altered the stability of the control containing Surfactant A4. Surfactant A1 showed the best stability after 3 days.

Example 6

The experiment was designed to assess paint compatibility. Water-in-oil emulsion cleaners were produced using the components listed below according to the method of Example 1.

TABLE 29

Emulsion Formulations

| ID | Xylene | A-150 | Emulsifier A | Surfactant A | DPG | IPAc | DI Water | Total | Craters |
|---|---|---|---|---|---|---|---|---|---|
| 3315-26-A | 36.40% | 3.60% | 0.30% | 0.30% | 0.30% | 20.00% | 39.10% | 39.10% | None |
| 3315-26-B | 36.40% | 3.60% | 0.30% | 0.30% | | 20.00% | 39.40% | 39.40% | 10 |

The experimental emulsions were wiped onto a glass panel then allowed to dry for 10 minutes before casting a 2.0 mils wet film of DuPont Gray Primer onto the panel. The panels were rated for craters.

Example 7

Solvent Performance Drop Test I was performed on commercially available paint using an oil-in-water cleaner (3266-127-A) and a comparative cleaner concentrate diluted to 25% by volume and heated to 120° F. (3315-23-A). Comparative Example 3315-23-A Cleaner concentrate contained Dipropylene Glycol methyl ether, 25% wt.; Propylene glycol methyl ether acetate, 9% wt.; Di-basic ester, 8% wt.; Triton® N-101, 1% wt.; Versene®, 1% wt.; Biosoft® N-300, 3% wt.; MEA, 0.5% wt.; and DI water, 52.5% wt.

TABLE 30

Test Results: Solvent Performance Drop Test

| Paint | ID | Drops to clean | Solvent Temp | Paint removal |
|---|---|---|---|---|
| Rohm and Haas Ad Pro Black Primer FG 33048 | 3266-127-A | 18 | 77° F. | 100% |
| | Comp. Ex. 3315-23-A | 40+ | 120° F. | 0% |
| PPG White Base SAC60521A | 3266-127-A | 26 | 77° F. | 100% |
| | Comp. Ex. 3315-23-A | 40+ | 120° F. | 0% |
| Dupont Clear Coat RK8148 | 3266-127-A | 24 | 77° F. | 100% |
| | Comp. Ex. 3315-23-A | 40+ | 120° F. | 0% |
| PPG Clear Acrylic W29841 | 3266-127-A | 24 | 77° F. | 100% |
| | Comp. Ex. 3315-23-A | 40+ | 120° F. | 0% |

Example 8

The performance of water continuous emulsions, solvent continuous microemulsions versus solvent continuous emulsions was evaluated. Water-in-oil emulsion cleaners were produced using the components listed below according to the method of Example 1. Sample ID 3200-166-G was designed to be a oil in water emulsion; for this sample, add mix #2 and Surfactant A into the vessel then slowly add water.

TABLE 31

Emulsion Formulations

| ID | Xylene | 1-Butoxy-2-propanol | A-150 | Emulsifier A | Surfactant A | DPG | Surfactant H | DI Water |
|---|---|---|---|---|---|---|---|---|
| 3200-166-A | 47.00% | 0.00% | 3.00% | 0.30% | 0.30% | 0.30% | 0.00% | 49.10% |
| 3200-166-B | 57.00% | 0.00% | 3.00% | 0.30% | 0.30% | 0.30% | 0.00% | 39.10% |
| 3200-166-C | 67.00% | 0.00% | 3.00% | 0.30% | 0.30% | 0.30% | 0.00% | 29.10% |
| 3200-166-D | 77.00% | 0.00% | 3.00% | 0.30% | 0.30% | 0.30% | 0.00% | 19.10% |
| 3200-166-E | 87.00% | 0.00% | 3.00% | 0.30% | 0.30% | 0.30% | 0.00% | 9.10% |
| 3200-166-F | 100.00% | 0.00% | 0.00% | 0.00% | 0.00% | 0.00% | 0.00% | 0.00% |
| 3200-166-G[1] | 47.00% | 0.00% | 3.00% | 0.00% | 0.60% | 0.00% | 0.00% | 49.40% |
| 3200-167-A[2] | 26.10% | 12.30% | 0.00% | 0.50% | 0.00% | 0.00% | 34.4 | 26.70% |

[1] "Oil in Water Emulsion"
[2] "Micro Emulsion"

TABLE 32

Emulsion Properties

| Sample ID | Specific Gravity Calculated | Viscosity in cps | Ransberg Resistivity via probe method in Mohms | Conductivity uS |
|---|---|---|---|---|
| 3200-166-A | 0.931 | 6.72 | 40.4 | 0.1 |
| 3200-166-B | 0.919 | 4.82 | 44.7 | 0.1 |
| 3200-166-C | 0.906 | 4.02 | 47.4 | 0.1 |
| 3200-166-D | 0.894 | 3.18 | 48.9 | 0.1 |
| 3200-166-B | 0.882 | 2.7 | 77.6 | 0.1 |
| 3200-166-F | 0.87 | 2.58 | 5900 | 0.1 |
| 3200-166-G | 0.931 | 19.74 | 0.004 | 310 |
| 3200-167-A | 0.984 | 10.2 | NA | 39 |

The purge cycle and equipment settings for the testing according to the Automated Purge Cycle Test are listed in Tables 33 and 34.

TABLE 33

Equipment Settings for Purge Cycle

| Pump Pressure Regulator Setting/Head Fluid Pressure Setting | Back Pressure Regulator setting | High Pressure Air Setting | Hose Length from Color Tree to Fluid Regulator | Hose ID from color changer to bell atomizer | Paint |
|---|---|---|---|---|---|
| 80 psi/150 psi | 95 psi | 80 psi | 10 feet | ⅛ inch ID | DuPont Primer |

TABLE 34

The purge cycle settings were the same as those shown in Table 4

| PURGE CYCLE | 1 | 2 | 3 | 4 | 5 | 6 | 7 | 8 | 9 | 10 |
|---|---|---|---|---|---|---|---|---|---|---|

Reynolds Numbers are shown in Table 35 for the formulations of Table 31.

TABLE 35

Calculated Reynolds Number Comparison Chart

| Sample ID | Volume per purge cycle | Flow Rate cm3/sec | Viscosity Purge at 72 F. (cps) | Reynolds # |
|---|---|---|---|---|
| 3200-166-A | 195 | 97.5 | 6.72 | 4300 |
| 3200-166-B | 195 | 97.5 | 4.82 | 5917 |
| 3200-166-C | 205 | 102.5 | 4.02 | 7353 |
| 3200-166-D | 210 | 105 | 3.18 | 9396 |
| 3200-166-E | 210 | 105 | 2.7 | 10918 |
| 3200-166-F | 210 | 105 | 2.58 | 11270 |
| 3200-166-G | 175 | 87.5 | 19.74 | 1313 |
| 3200-167-A | 175 | 87.5 | 10.2 | 2687 |
| Commercial Cleaner 1 | 200 | 100 | 2.58 | 10734 |

Commercial Cleaner 1 was a 100 wt. % solvent blend reported by the manufacturer as 30-60% xylene, the remainder being aromatic hydrocarbons, ethyl benzene, cumene, n-butyl alcohol, isopropyl alcohol, and n-butyl acetate.

All purge samples collected were sonicated for at least 2 minutes to disperse any paint into solution. The water-in-oil emulsion samples were diluted using Ethyl Lactate, which couples the water and appears to solvate the emulsifier. Using a volumetric pipette, the sample was placed into a 40 dram vial with an appropriate amount of a Ethyl Lactate then sonicated for 30 seconds. This solution was measured on the turbidity meter to determine the level of paint in NTU's. The Xylene samples were sonicated then diluted using a 75%:25% ratio xylene:n-butyl acetate blend. The results are shown in Tables 36 and 37.

TABLE 36

Results Summary

| Emulsion Type | Purge Cycle Sequence collected | Solvent Purge | Purge Volume in ml Per cycle | Adjusted Turbidity in NTU's Minus Background |
|---|---|---|---|---|
| Oil Continuous Microemulsion | 2 | 3200-167-A | 175 | 18898 |

TABLE 36-continued

Results Summary

| Emulsion Type | Purge Cycle Sequence collected | Solvent Purge | Purge Volume in ml Per cycle | Adjusted Turbidity in NTU's Minus Background |
|---|---|---|---|---|
| Oil Continuous Microemulsion | 3 | 3200-167-A | 175 | 938 |
| Oil Continuous Microemulsion | 4 | 3200-167-A | 175 | 233 |
|  | Post Flush | Acetone Post Flush Cycle | 235 | 148 |
| Water in Oil | 2 | 3200-166-C | 205 | 9130 |
| Water in Oil | 3 | 3200-166-C | 205 | 135 |
| Water in Oil | 4 | 3200-166-C | 205 | 55 |
|  | Post Flush | Acetone Post Flush Cycle | 220 | 22 |

Table 36 shows the difference in cleaning performance for a oil continuous microemulsion versus an oil continuous water in oil emulsion at similar water levels in the formulations. The data shows a 50% to 85% reduction in turbidity, which indicates that the oil continuous water in oil emulsion cleaned the paint better. The post rinse using acetone also shows a significant amount of residual paint left behind by the microemulsion system.

TABLE 37

Results Summary

| Emulsion Type | Purge Cycle Sequence collected | Solvent Purge | Purge Volume in ml Per cycle | Adjusted Turbidity in NTU's Minus Background |
|---|---|---|---|---|
| Water in Oil | 2 | 3200-166-A | 195 | 23095 |
| Water in Oil | 3 | 3200-166-A | 195 | 310 |
| Water in Oil | 4 | 3200-166-A | 195 | 90 |
|  | Post Flush | Acetone Post Flush Cycle | 218 | 64 |
| Oil in Water | 2 | 3200-166-G | 175 | 22415 |
| Oil in Water | 3 | 3200-166-G | 175 | 1415 |
| Oil in Water | 4 | 3200-166-G | 175 | 560 |
|  | Post Flush | Acetone Post Flush Cycle | 220 | 516 |

Table 37 shows the difference in solvent-based paint cleaning performance for a oil in water emulsion versus a water in oil emulsion according to the invention. The improved performance of the water in oil emulsion is highlighted by the 3rd, 4th and acetone post rinse collected which shows a reduction in turbidity of 78% to 88 as compared to the a oil in water emulsion. The high turbidity in the post rinse of the oil in water emulsion indicates that a significant amount of paint was not removed from the application equipment.

Example 9

Water-in-oil emulsion cleaners were produced using the components listed in Table 38 according to the method of Example 1. The properties of the water-in-oil emulsion cleaners are also recited in Table 38

TABLE 38

Emulsion Formulations and Properties

| ID | IPAc. | A-100 | A-150 | Emulsifier A | Emulsifier B | DPG | DI Water | Total | LV Viscosity Spindle #1, 100 RPM cps |
|---|---|---|---|---|---|---|---|---|---|
| 3315-34-A | 15.0% | 33.0% | 2.0% | 0.3% |  | 0.2% | 49.3% | 100.0% | 7.95 |
| 3315-34-B | 15.0% | 33.0% | 2.0% |  | 0.5% | 0.2% | 49.1% | 100.0% | 7.5 |
| 3315-43-C | 15.0% | 33.0% | 2.0% |  | 0.5% | 0.2% | 49.3% | 100.0% | 11.76 |
| 3315-34-D | 12.0% | 26.4% | 1.6% | 0.3% |  | 0.2% | 59.3% | 100.0% | 15.42 |
| 3315-34-E | 12.0% | 26.4% | 1.6% |  | 0.5% | 0.2% | 59.1% | 100.0% | 13.2 |
| 3315-43-F | 12.0% | 26.4% | 1.6% |  | 0.5% | 0.2% | 59.3% | 100.0% | 19.74 |
| 3315-34-G | 9.0% | 19.8% | 1.2% | 0.3% |  | 0.2% | 69.3% | 100.0% | 53.76 |
| 3315-34-H | 9.0% | 19.8% | 1.2% |  | 0.5% | 0.2% | 69.1% | 100.0% | 29.28 |
| 3315-34-I | 9.0% | 19.8% | 1.2% |  | 0.5% | 0.2% | 69.3% | 100.0% |  |
| 3315-43-J | 9.0% | 19.8% | 1.2% | 0.3% |  | 0.2% | 69.5% | 100.0% | 629 @ LV spindle #3, 50 RPM |
| 3315-43-K | 9.0% | 19.8% | 1.2% |  | 0.8% | 0.2% | 69.0% | 100.0% | 239.1 |
| 3315-34-L | 9.0% | 19.8% | 1.2% |  | 0.5% | 0.2% | 69.1% | 100.0% | 42.6 @ LV #2 |
| 3315-34-L(2) | 9.0% | 19.8% | 1.2% |  | 0.5% | 0.2% | 69.1% | 100.0% | 55.26 @ LV#1 |
| 3315-34-M | 9.0% | 19.8% | 1.2% |  | 0.5% | 0.2% | 69.1% | 100.0% | 85 @ LV #1, 60 RPM |
| 3315-34-N | 9.0% | 19.8% | 1.2% |  | 0.5% | 0.2% | 69.1% | 100.0% | 39 |
| 3315-34-O | 9.0% | 19.8% | 1.2% |  | 0.5% | 0.2% | 69.1% | 100.0% | 607 @ LV#2 |
| 3315-34-P | 9.0% | 19.8% | 1.2% |  | 0.5% | 0.2% | 69.1% | 100.0% | 106 |

TABLE 38-continued

Emulsion Formulations and Properties

| ID | | | | | | | | | |
|---|---|---|---|---|---|---|---|---|---|
| 3315-34-Q | 9.0% | 19.8% | 1.2% | | 0.5% | 0.2% | 69.1% | 100.0% | 115 |
| 3315-34-R | 15.0% | 33.0% | 2.0% | | 0.5% | 0.2% | 49.1% | 100.0% | 8.0 @ LV#1 |
| 3315-34-S | 15.0% | 33.0% | 2.0% | | 0.5% | 0.2% | 49.1% | 100.0% | |
| 3315-34-T | 9.0% | 19.8% | 1.2% | | 0.5% | 0.2% | 69.1% | 100.0% | |
| 3315-34-U | 12.0% | 26.4% | 1.6% | | 0.5% | 0.2% | 59.1% | 100.0% | 16 @ LV#1 |
| 3315-34-V | 15.0% | 33.0% | 2.0% | | 0.5% | 0.2% | 49.1% | 100.0% | 9.3 @ LV #1 |
| 3315-34-W | | 26.4% | 1.6% | | 0.5% | 0.2% | 59.1% | 100.0% | 13.4 @ LV #1 |
| 3315-34-X | | 19.8% | 1.2% | | 0.5% | 0.2% | 69.1% | 100.0% | 39.2 @ LV #1 |
| 3315-34-Y | | 26.4% | 1.6% | | 0.5% | 0.2% | 59.1% | 100.0% | 12.8 @ LV #1 |
| 3315-34-Z | | 19.8% | 1.2% | | 0.5% | 0.2% | 69.1% | 100.0% | 31.7 @ LV #1 |
| 3315-34-Z(2) | | 19.8% | 1.2% | | 0.5% | 0.2% | 69.1% | 100.0% | 29.82 @ LV #1 |
| 3315-34-AA | 9.0% | 19.8% | 1.2% | | 0.5% | 0.2% | 69.3% | 100.00% | 46.68 |
| 3315-34-BB | 9.0% | 19.8% | 1.2% | | 0.5% | 0.2% | 69.2% | 100.0% | 37.86 |
| 3315-34-CC | 9.0% | 19.8% | 1.2% | | 0.5% | 0.2% | 69.0% | 100.0% | 29.82 |
| 3315-34-DD | 9.0% | 19.8% | 1.2% | | 0.5% | 0.2% | 68.9% | 100.0% | 25.92 |
| 3315-34-EE | 9.0% | 19.8% | 1.2% | | 0.5% | 0.2% | 68.8% | 100.0% | 24.6 |
| 3315-34-FF | 9.0% | 19.8% | 1.2% | | 0.5% | 0.2% | 69.3% | 100.0% | 224.0 @ 12 RPM |
| 3315-34-GG | 9.0% | 19.8% | 1.2% | | 0.5% | 0.2% | 69.2% | 100.0% | 63.8 @ 50 RPM |
| 3315-34-HH | 9.0% | 19.8% | 1.2% | | 0.5% | 0.2% | 69.0% | 100.0% | 30.84 |
| 3315-34-II | 9.0% | 19.8% | 1.2% | | 0.5% | 0.2% | 68.9% | 100.0% | 35.1 |
| 3315-34-JJ | 9.0% | 19.8% | 1.2% | | 0.5% | 0.2% | 68.8% | 100.0% | NA |
| 3315-34-KK | 9.0% | 19.8% | 1.2% | | 0.5% | 0.2% | 68.7% | 100.0% | 42.18 |
| 3315-34-LL | 9.0% | 19.8% | 1.2% | | 0.5% | 0.2% | 68.6% | 100.0% | NA |
| 3315-34-MM | 9.0% | 19.8% | 1.2% | | 0.5% | 0.2% | 68.5% | 100.0% | NA |
| 3315-34-KK2 | 9.0% | 19.8% | 1.2% | | 0.5% | 0.2% | 68.7% | 100.0% | 31.14 |
| 3315-34-LL2 | 9.0% | 19.8% | 1.2% | | 0.5% | 0.2% | 68.6% | 100.0% | 52.1 |
| 3315-34-MM2 | 9.0% | 19.8% | 1.2% | | 0.5% | 0.2% | 68.5% | 100.0% | NA |
| 3315-34-NN | 19.8% | 9.0% | 1.2% | | 0.5% | 0.2% | 68.9% | 100.0% | 22.5 |
| 3315-34-OO | | 9.0% | 1.2% | | 0.5% | 0.2% | 68.9% | 100.0% | 47.82 |
| 3315-43-PP | 15.0% | 33.0% | 2.0% | 0.3% | | 0.2% | 49.5% | 100.0% | 9 |
| 3315-43-QQ | 15.0% | 33.0% | 2.0% | | 0.5% | 0.2% | 49.3% | 100.0% | 9.66 |
| 3315-43-RR | 12.0% | 26.4% | 1.6% | 0.3% | | 0.2% | 59.5% | 100.0% | 22.86 |
| 3315-43-SS | 12.0% | 26.4% | 1.6% | | 0.5% | 0.2% | 59.3% | 100.0% | 17.64 |

| ID | RV Viscosity Spindle #1, 50 RPM cps | Resistivity via probe method in Mohms | Emulsion Type observed after 1 hour | Stability after 1 days at Rest |
|---|---|---|---|---|
| 3315-34-A | 13.9 | 3.1 | | separation not visible |
| 3315-34-B | 13.41 | 1.5 | | separation not visible |

TABLE 38-continued

Emulsion Formulations and Properties

| ID | | | |
|---|---|---|---|
| 3315-43-C | 17.56 | 0.8 | 28% by height on top layer |
| 3315-34-D | 24.03 | 1.5 | 28% by height on top layer |
| 3315-34-E | 19.75 | 0.7 | separation not visible |
| 3315-43-F | 32.02 @ 30 RPM | 1.4 | 24% by height on top layer |
| 3315-34-G | 63.53 @ RV spindle#2, 50 RPM | 1.8 | separation not visible |
| 3315-34-H | 41.91 @ 10 RPM | 0.4 | separation not visible |
| 3315-34-I | | 0 | product made an oil in water emulsion |
| 3315-43-J | 2130 @ RV Spindle #5 @ 10% RPM | 1.6 | separation not visible |
| 3315-43-K | 182.1 @ RV Spindle #3, 50 RPM | 1.3 | 9.5% by height on top layer |
| 3315-34-L | 61 @ RV #2 | 0.3 | separation not visible |
| 3315-34-L(2) | 92.81 @ RV#1, 10% | 0.4 | |
| 3315-34-M | 86 @ RV #3 | 1.9 | 21% by height on top layer |
| 3315-34-N | 60 | 2.4 | 14% by height on top layer |
| 3315-34-O | 171 @ RV #4 | 1.3 | 5% by height on top layer |
| 3315-34-P | 82.5 | 2.6 | 15% by height on top layer |
| 3315-34-Q | 114 @ RV #3 | 0.7 | 15% by height on top layer |
| 3315-34-R | 26 @ RV#2 | 3.5 | |
| 3315-34-S | | | Emulsion Broke |
| 3315-34-T | | | Emulsion Broke |
| 3315-34-U | 40 @ RV#2 | 3 | 28% volume separation |
| 3315-34-V | 27.23 @ RV #2 | 2.5 | 44% vol. separation |
| 3315-34-W | 28.9 @ RV #2, 50% | 20K/0.1M | separation not visible |
| 3315-34-X | 59.1 @ RV #2, 50% | 14K/0.0M | separation not visible |
| 3315-34-Y | 19.1 @ RV #1, 30% | 34K/0.1M | separation not visible |
| 3315-34-Z | 51.1 @ RV #1, 10% | 26K/0.1M | |
| 3315-34-Z(2) | 48.09 @ RV#1, 10% | 27K/0.1M | separation not visible |
| 3315-34-AA | 72.56 @ 10 RPM | 100K/1.1M | 6.9% by height on top layer |
| 3315-34-BB | 59.44 @ 10 RPM | 140K/0.9M | 4.1% by height on top layer |
| 3315-34-CC | 45.19 @ 10 RPM | 191K/0.5M | 4.1% by height on top layer |
| 3315-34-DD | 40.83 @ 20 RPM | 32K/0.4M | 4.1% by height on top layer |
| 3315-34-EE | 36.98 @ 20 RPM | 30K/0.4M | 4.1% by height on top layer |
| 3315-34-FF | 405 @2 RPM | 210K/0.7M | 14% by height on top layer |
| 3315-34-GG | 93.47 @ 10 RPM | 195K/0.4M | 7.14% by height on top layer |
| 3315-34-HH | 45.09 @ 10 RPM | 200-60K fast drop/0.4M | 0% by height on top layer |
| 3315-34-II | 65.63 @ 10 RPM | 36K/0.3M | 5.55% by height on top layer |
| 3315-34-JJ | NA | 0.0M | Inverted 53.3% by height on top layer |
| 3315-34-KK | 45.89 @ 20 RPM | 30K/0.6M | 6.8% by height on top layer no water seen at probe |
| 3315-34-LL | NA | NA | Inverted |

TABLE 38-continued

| | Emulsion Formulations and Properties | | | |
|---|---|---|---|---|
| 3315-34-MM | NA | NA | | Inverted |
| 3315-34-KK2 | 49.14 @ 12 RPM | 30K/1.2M | | 6.7% by height on top layer water seen at probe |
| 3315-34-LL2 | 228.5 @ 4.5 rpm | 30K/0.7M | | 2.7% by height on the top layer |
| 3315-34-MM2 | NA | NA | | Inverted |
| 3315-34-NN | 35.20 @ RV#1, 20 RPM | 0.1M/26K | | |
| 3315-34-OO | 155 @ RV#1, 5 RPM | 0.1M/01K | | |
| 3315-43-PP | 14.50 @ 30 RPM | 4.2 | 33% separation | 36% by height on top layer |
| 3315-43-QQ | 13.34 @ 30 RPM | 4.2 | no separation | 36% by height on top layer |
| 3315-43-RR | 35.53 @ 20 RPM | 1.3 | 13% separation | 23% by height on top layer |
| 3315-43-SS | 25.22 @ 20 RPM | 1.6 | no separation | 23% by height on top layer |

TABLE 39

Emulsion Formulations and Properties

| ID | IPAc. | A-100 | A-150 | Emulsifier A | Emulsifier B | Surfactant A | DPG | DI Water | Total | LV Viscosity Spindle #1, 100 RPM cps | RV Viscosity Spindle #1, 50 RPM cps | Resistivity via probe method in Mohms | Emulsion Type observed after 1 hour | Stability after 1 days at Rest |
|---|---|---|---|---|---|---|---|---|---|---|---|---|---|---|
| 3315-43-A | 15.0% | 33.0% | 2.0% | 0.3% | | 0.2% | 0.2% | 49.3% | 100.0% | 7.95 | 13.9 | 3.1 | | separation not visible |
| 3315-43-B | 15.0% | 33.0% | 2.0% | | 0.5% | 0.2% | 0.2% | 49.1% | 100.0% | 7.5 | 13.41 | 1.5 | | separation not visible |
| 3315-43-D | 12.0% | 26.4% | 1.6% | 0.3% | | 0.2% | 0.2% | 59.3% | 100.0% | 15.42 | 24.03 | 1.5 | | 28% by height on top layer |
| 3315-43-E | 12.0% | 26.4% | 1.6% | | 0.5% | 0.2% | 0.2% | 59.1% | 100.0% | 13.2 | 19.75 | 0.7 | | separation not visible |
| 3315-43-G | 9.0% | 19.8% | 1.2% | 0.3% | | 0.2% | 0.2% | 69.3% | 100.0% | 53.76 | 63.53 @ RV spindle#2, 50 RPM | 1.8 | | separation not visible |
| 3315-43-H | 9.0% | 19.8% | 1.2% | | 0.5% | 0.2% | 0.2% | 69.1% | 100.0% | 29.28 | 41.91 @ 10 RPM | 0.4 | | separation not visible |
| 3315-34-L | 9.0% | 19.8% | 1.2% | | 0.5% | | 0.2% | 69.1% | 100.0% | 42.6 @ LV #2 | 61 @ RV #2 | 0.3 | | separation not visible |
| 3315-34-L(2) | 9.0% | 19.8% | 1.2% | | 0.5% | | 0.2% | 69.1% | 100.0% | 55.26 @ LV#1 | 92.81 @ RV#1, 10% | 0.4 | | |
| 3315-34-M | 9.0% | 19.8% | 1.2% | | 0.5% | | 0.2% | 69.1% | 100.0% | 85 @ LV #1, 60 RPM | 86 @ RV #3 | 1.9 | | 21% by height on top layer |
| 3315-34-N | 9.0% | 19.8% | 1.2% | | 0.5% | | 0.2% | 69.1% | 100.0% | 39 | 60 | 2.4 | | 14% by height on top layer |
| 3315-34-O | 9.0% | 19.8% | 1.2% | | 0.5% | | 0.2% | 69.1% | 100.0% | 607 @ LV#2 | 171 @ RV #4 | 1.3 | | 5% by height on top layer |
| 3315-34-P | 9.0% | 19.8% | 1.2% | | 0.5% | | 0.2% | 69.1% | 100.0% | 106 | 82.5 | 2.6 | | 15% by height on top layer |
| 3315-34-Q | 9.0% | 19.8% | 1.2% | | 0.5% | | 0.2% | 69.1% | 100.0% | 115 | 114 @ RV #3 | 0.7 | | 15% by height on top layer |
| 3315-34-R | 15.0% | 33.0% | 2.0% | | 0.5% | | 0.2% | 49.1% | 100.0% | 8.0 @ LV#1 | 26 @ RV#2 | 3.5 | | Emulsion Broke |
| 3315-34-S | 9.0% | 19.8% | 1.2% | | 0.5% | | 0.2% | 69.1% | 100.0% | | | | | Emulsion Broke |
| 3315-34-T | 12.0% | 26.4% | 1.6% | | 0.5% | | 0.2% | 59.1% | 100.0% | 16 @ LV#1 | 40 @ RV#2 | 3 | | 28% volume separation |
| 3315-34-U | 15.0% | 33.0% | 2.0% | | 0.5% | | 0.2% | 49.1% | 100.0% | 9.3 @ LV #1 | 27.23 @ RV #2 | 2.5 | | 44% vol. separation |
| 3315-34-V | | 26.4% | 1.6% | | 0.5% | 0.2% | 0.2% | 59.1% | 100.0% | 13.4 @ LV #1 | 28.9 @ RV #2, 50% | 20K/ 0.1M | | separation not visible |
| 3315-34-X | | 19.8% | 1.2% | | 0.5% | 0.2% | 0.2% | 69.1% | 100.0% | 39.2 @ LV #1 | 59.1 @ RV #2, 50% | 14K/ 0.0M | | separation not visible |

TABLE 39-continued

Emulsion Formulations and Properties

| ID | IPAc. | A-100 | A-150 | Emulsifier A | Emulsifier B | Surfactant A | DPG | DI Water | Total | IV Viscosity Spindle #1, 100 RPM cps | RV Viscosity Spindle #1, 50 RPM cps | Resistivity via probe method in Mohms | Emulsion Type observed after 1 hour | Stability after 1 days at Rest |
|---|---|---|---|---|---|---|---|---|---|---|---|---|---|---|
| 3315-34-Y | | 26.4% | 1.6% | | 0.5% | 0.2% | 0.2% | 59.1% | 100.0% | 12.8 @ LV#1 | 19.1 @ RV #1, 30% | 34K/ 0.1M | | separation not visible |
| 3315-34-Z | | 19.8% | 1.2% | | 0.5% | 0.2% | 0.2% | 69.1% | 100.0% | 31.7 @ LV#1 | 51.1 @ RV #1, 10% | 26K/ 0.1M | | |
| 3315-34-Z(2) | | 19.8% | 1.2% | | 0.5% | 0.2% | 0.2% | 69.1% | 100.0% | 29.82 @ LV#1 | 48.09 @ RV#1, 10% | 27K/ 0.1M | | separation not visible |
| 3315-34-AA | 9.0% | 19.8% | 1.2% | | 0.5% | 0.05% | 0.2% | 69.3% | 100.00% | 46.68 | 72.56 @ 10 RPM | 100K/ 1.1M | | 6.9% by height on top layer |
| 3315-34-BB | 9.0% | 19.8% | 1.2% | | 0.5% | 0.1% | 0.2% | 69.2% | 100.0% | 37.86 | 59.44 @ 10 RPM | 140K/ 0.9M | | 4.1% by height on top layer |
| 3315-34-CC | 9.0% | 19.8% | 1.2% | | 0.5% | 0.3% | 0.2% | 69.0% | 100.0% | 29.82 | 45.19 @ 10 RPM | 191K/ 0.5M | | 4.1% by height on top layer |
| 3315-34-DD | 9.0% | 19.8% | 1.2% | | 0.5% | 0.4% | 0.2% | 68.9% | 100.0% | 25.92 | 40.83 @ 20 RPM | 32K/ 0.4M | | 4.1% by height on top layer |
| 3315-34-EE | 9.0% | 19.8% | 1.2% | | 0.5% | 0.5% | 0.2% | 68.8% | 100.0% | 24.6 | 36.98 @ 20 RPM | 30K/ 0.4M | | 4.1% by height on top layer |
| 3315-34-FF | 9.0% | 19.8% | 1.2% | | 0.5% | | 0.2% | 69.3% | 100.0% | 224.0 @ 12 RPM | 405 @ 2 RPM | 210K/ 0.7M | | 14% by height on top layer |
| 3315-34-GG | 9.0% | 19.8% | 1.2% | | 0.5% | | 0.2% | 69.2% | 100.0% | 63.8 @ 50 RPM | 93.47 @ 10 RPM | 195K/ 0.4M | | 7.14% by height on top layer |
| 3315-34-HH | 9.0% | 19.8% | 1.2% | | 0.5% | | 0.2% | 69.0% | 100.0% | 30.84 | 45.09 @ 10 RPM | 200-60K fast drop/ 0.4M | | 0% by height on top layer |
| 3315-34-II | 9.0% | 19.8% | 1.2% | | 0.5% | | 0.2% | 68.9% | 100.0% | 35.1 | 65.63 @ 10 RPM | 36K/ 0.3M | | 5.55% by height on top layer |
| 3315-34-JJ | 9.0% | 19.8% | 1.2% | | 0.5% | | 0.2% | 68.8% | 100.0% | NA | NA | 0.0M | | Inverted 53.3% by height on top layer |
| 3315-34-KK | 9.0% | 19.8% | 1.2% | | 0.5% | 0.6% | 0.2% | 68.7% | 100.0% | 42.18 | 45.89 @ 20 RPM | 30K/ 0.6M | | 6.8% by height on top layer |
| 3315-34-LL | 9.0% | 19.8% | 1.2% | | 0.5% | 0.7% | 0.2% | 68.6% | 100.0% | NA | NA | NA | | Inverted no water seen at probe |
| 3315-34-MM | 9.0% | 19.8% | 1.2% | | 0.5% | 0.8% | 0.2% | 68.5% | 100.0% | NA | NA | NA | | Inverted |
| 3315-34-KK2 | 9.0% | 19.8% | 1.2% | | 0.5% | 0.6% | 0.2% | 68.7% | 100.0% | 31.14 | 49.14 @ 12 RPM | 30K/ 1.2M | | 6.7% by height on top layer water seen at probe |
| 3315-34-LL2 | 9.0% | 19.8% | 1.2% | | 0.5% | 0.7% | 0.2% | 68.6% | 100.0% | 52.1 | 228.5 @ 4.5 rpm | 30K/ 0.7M | | 2.7% by height on top layer |
| 3315-34-MM2 | 9.0% | 19.8% | 1.2% | | 0.5% | 0.8% | 0.2% | 68.5% | 100.0% | NA | NA | NA | | Inverted |
| 3315-34-NN | 19.8% | 9.0% | 1.2% | | 0.5% | 0.4% | 0.2% | 68.9% | 100.0% | 22.5 | 35.20 @ RV#1, 20 RPM | 0.1M/ 26K | | |

TABLE 39-continued

Emulsion Formulations and Properties

| ID | IPAc. | A-100 | A-150 | Emulsifier A | Emulsifier B | Surfactant A | DPG | DI Water | Total | IV Viscosity Spindle #1, 100 RPM cps | RV Viscosity Spindle #1, 50 RPM cps | Resistivity via probe method in Mohms | Emulsion Type observed after 1 hour | Stability after 1 days at Rest |
|---|---|---|---|---|---|---|---|---|---|---|---|---|---|---|
| 3315-34-OO | | 9.0% | 1.2% | | 0.5% | 0.4% | 0.2% | 68.9% | 100.0% | 47.82 | 155 @ RV#1, 5 RPM | 0.1M/ 01K | | |
| 3315-34-PP | 15.0% | 33.0% | 2.0% | 0.3% | | | 0.2% | 49.5% | 100.0% | 9 | 14.50 @ 30 RPM | 4.2 | 33% separation | 36% by height on top layer |
| 3315-34-QQ | 15.0% | 33.0% | 2.0% | | 0.5% | | 0.2% | 49.3% | 100.0% | 9.66 | 13.34 @ 30 RPM | 4.2 | no separation | 36% by height on top layer |
| 3315-34-RR | 12.0% | 26.4% | 1.6% | 0.3% | | | 0.2% | 59.5% | 100.0% | 22.86 | 35.53 @ 20 RPM | 1.3 | 13% separation | 23% by height on top layer |
| 3315-34-SS | 12.0% | 26.4% | 1.6% | | 0.5% | | 0.2% | 59.3% | 100.0% | 17.64 | 25.22 @ 20 RPM | 1.6 | no separation | 23% by height on top layer |

TABLE 40

Emulsion Properties

| ID | Brookfield LV Viscosity (cps) | % wt. Solvent |
|---|---|---|
| Emulsifier A Formulas with 0.2% wt. Anionic Surfactant Viscosity Effects | | |
| 3315-43-G | 53.76 | 30% |
| 3315-43-D | 15.42 | 40% |
| 3315-43-A | 7.95 | 50% |
| Emulsifier B Formulas with 0.2% wt. Anionic Surfactant Viscosity Effects | | |
| 3315-43-H | 29.28 | 30% |
| 3315-43-E | 13.2 | 40% |
| 3315-43-B | 7.5 | 50% |

TABLE 41

Viscosity Effects of Emulsifier Type with and without 0.2% wt. Anionic Surfactant

| Product ID | Brookfield LV Viscosity (cps) | % wt. Solvent | Anionic Surfactant | Emulsifying Agent |
|---|---|---|---|---|
| 3315-43-K | 239.1 | 30% | No | Emulsifier B |
| 3315-43-H | 29.28 | 30% | Yes | Emulsifier B |
| 3315-43-J | 629 | 30% | No | Emulsifier A |
| 3315-43-G | 53.76 | 30% | Yes | Emulsifier A |

Table 41 shows the reduction in viscosity with the addition of 0.2 wt. % anionic surfactant. The data shows a 91% reduction in viscosity in the presence of 0.2 wt. %. anionic surfactant.

Additional anionic, cationic and non-ionic surfactants were evaluated. The surfactants tested are listed in Table 42.

TABLE 42

Surfactants

| Surfactant | Chemical Description | Charge |
|---|---|---|
| Surfactant B | isopropylamine dodecylbenzene sulfonate | Anionic |
| Surfactant C | PEG-5 Cocamine, R—N((EO)$_5$—H)$_2$ | Nonionic |
| Surfactant D | nonylphenol ethoxylate phosphate ester | Anionic |
| Surfactant E | nonylphenol ethoxylate, n = 10.5 to 11 | Non-ionic |
| Surfactant F | phenol ethoxylate, n = 1.0-1.5 | Non-ionic |
| Surfactant G | (2,4,8-methyl)-C$_9$-(EO)$_8$—H | Non-ionic |
| Surfactant H | benzyl alcohol ethoxylate, n = 4 moles of EO | Non-ionic |
| Surfactant I | cocaamidopropyl hydroxy sultaine | Amphoteric |
| Surfactant J | di-tallow imidazolinium methyl sulfate | Cationic Quaternaries |
| Surfactant K | oleyl hydroxyethyl imidazoline | Cationic |

Using a constant base formula of 9.0 wt. % isopropyl acetate, 19.8 wt. % Aromatic 100, 1.2 wt. % Aromatic 150, 0.5 wt. % Emulsifier B, 0.2 wt % dipropylene glycol, 69.1 wt. % water and 0.2 wt. % of the respective surfactant, emulsions were made by combining the components and mixing thoroughly. Physical properties of the emulsions were measured, see Table 43.

TABLE 43

Physical Properties of Emulsions based on Different Surfactants

| ID | Surfactant | LV Viscosity Spindle #1, 100 RPM cps | Resistivity via probe method in Mohms | Emulsion Type observed after 1 hour | Stability after 1 day at Rest |
|---|---|---|---|---|---|
| 3315-43-H | A | 29.28 | 0.4 | | separation not visible |
| 3315-43-L | B | 42.6 @ LV #2 | 0.3 | | separation not visible |
| 3315-43-L(2) | B | 55.26 @ LV #1 | 0.4 | | separation not visible |
| 3315-43-M | C | 85 @ LV #1, 60 RPM | 1.9 | | 21% by height separation on top layer |
| 3315-43-N | D | 39 | 2.4 | | 14% by height separation on top layer |
| 3315-43-O | E | 607 @ LV#2 | 1.3 | | 5% by height separation on top layer |
| 3315-43-P | F | 106 | 2.6 | | 15% by height separation on top layer |
| 3315-43-Q | G | 115 | 0.7 | | 15% by height separation on top layer |
| 3315-43-T | H | | | | Emulsion Inverted to solvent in water |
| 3315-43-TT | I | 32.4 | 1.3 | no separation | 21.6% by height separation on top |
| 3315-43-UU | J | 35.7 | 0.5 | no separation | 6.0% by height Separation on top layer |
| 3315-43-VV | K | 82.8 @ 60 rpm | 1.2 | 8.40% | 23.5% by Height Separation on top layer |

The results listed in Table 43 show the biggest reduction in viscosity for the anionic, cationic or amphoteric surfactants. Some of the nonionic surfactant increased the viscosity or made the emulsion invert into an oil in water emulsion. The anionic Surfactant A, amphoteric Surfactant I, cationic quaternary Surfactant J, anionic Surfactant D all showed significant viscosity reduction results versus a control formula containing no stability additives. All emulsions were stable over a 24 hour dwell period without any signs of water separation at the bottom of the containers. Not all emulsions demonstrated the same level of anti-settling properties. This was easily seen over time as the stable emulsified water droplets settled to form a bottom phase leaving a top phase of primarily solvent. The settling effect due to gravity resulted in a viscosity gradient that will pose a problem with reproducible cleaning performance in the field. The only surfactants that were able to resist the force of gravity working on the emulsified water droplet were the anionic surfactants Surfactant A and the Surfactant B. To a lesser extent, Surfactant J showed only a 6.0% by height solvent phase separation after a 24 hour dwell time. The solvent continuous emulsion resistivity value in Mohms varied but all samples were equal to or greater than 0.3 Mohms. Surfactants that produced the highest emulsion cleaner resistivity with Emulsifier B as the key water in oil emulsifier were Surfactants C, D, F and I. Surfactant D and Surfactant I were the only two surfactants that produced an emulsion resistivity greater than 1.0 Mohms while also having an emulsion viscosity of less than 40 cps using LV#1 spindle.

Physical properties of emulsions containing varying levels of anionic Surfactant A were measured and compared. Using a constant base formula of 9.0 wt. % isopropyl acetate, 19.8 wt. % Aromatic 100, 1.2 wt. % Aromatic 150, and 0.2 wt % dipropylene glycol, emulsions were made by combining the components listed in Tables 44 and 45 and mixing thoroughly. Physical properties of the emulsions were measured, see Table 44 and 45.

TABLE 44

Emulsion Formulations and Properties

| ID | Emul. A | Emul. B | Surf. A | DI Water | LV Viscosity Spindle #1, 100 RPM cps | RV Viscosity Spindle #1, 50 RPM cps | Resistivity via probe method in Mohms | Stability after 1 days at Rest |
|---|---|---|---|---|---|---|---|---|
| *3315-43-J | 0.3% | | | 69.5% | 629 @ LV spindle #3, 50 RPM | 2130 @ RV Spindle # 5 @ 10% RPM | 1.6 | separation not visible |
| *3315-43-K | | 0.8% | | 69.0% | 239.1 | 182.1 @ RV Spindle #3, 50 RPM | 1.3 | 9.5% by height on top layer |
| 3315-43-AA | | 0.5% | 0.05% | 69.3% | 46.68 | 72.56 @ 10 RPM | 100K/1.1M | 6.9% by height on top layer |
| 3315-43-BB | | 0.5% | 0.1% | 69.2% | 37.86 | 59.44 @ 10 RPM | 140K/0.9M | 4.1% by height on top layer |
| 3315-43-CC | | 0.5% | 0.3% | 69.0% | 29.82 | 45.19 @ 10 RPM | 191K/0.5M | 4.1% by height on top layer |
| 3315-43-DD | | 0.5% | 0.4% | 68.9% | 25.92 | 40.83 @ 20 RPM | 32K/0.4M | 4.1% by height on top layer |
| 3315-43-EE | | 0.5% | 0.5% | 68.8% | 24.6 | 36.98 @ 20 RPM | 30K/0.4M | 4.1% by height on top layer |
| 3315-43-KK2 | | 0.5% | 0.6% | 68.7% | 31.14 | 49.14 @ 12 RPM | 30K/1.2M | 6.7% by height on top layer water seen at probe |
| 3315-43-LL2 | | 0.5% | 0.7% | 68.6% | 52.1 | 228.5 @ 4.5 rpm | 30K/0.7M | 2.7% by height on the top layer |
| 3315-43-MM2 | | 0.5% | 0.8% | 68.5% | NA | NA | NA | Inverted |

*3315-43-J and 3315-43-K are controls containing no stabilizing surfactant additive.

TABLE 45

Emulsion Formulations and Properties

| ID | Emul. A | Emul. B | Surf. B | DI Water | Total | LV Viscosity Spindle #1, 100 RPM cps | Resistivity using Ransburg Resistivity Meter Mohms | Stability after 1 days at Rest |
|---|---|---|---|---|---|---|---|---|
| *3315-43-J | 0.3% | | | 69.5% | 100.0% | 629 @ LV spindle #3, 50 RPM | 1.6 | separation not visible |
| *3315-43-K | | 0.8% | | 69.0% | 100.0% | 239.1 | 1.3 | 9.5% by height on top layer |
| 3315-43-FF | | 0.5% | 0.05% | 69.3% | 100.0% | 224.0 @ 12 RPM | 0.7 | 14% by height on top layer |
| 3315-43-GG | | 0.5% | 0.1% | 69.2% | 100.0% | 63.8 @ 50 RPM | 0.4 | 7.14% by height on top layer |
| 3315-43-HH | | 0.5% | 0.3% | 69.0% | 100.0% | 30.84 | 0.4 | 0% by height on top layer |
| 3315-43-II | | 0.5% | 0.4% | 68.9% | 100.0% | 35.1 | 0.3 | 5.55% by height on top layer |
| 3315-43-JJ | | 0.5% | 0.5% | 68.8% | 100.0% | NA | 0 | Inverted 53.3% by height on top layer |

*3315-43-J and 3315-43-K are controls containing no stabilizing surfactant additive.

An emulsion made according to 3315-43-AA, but in the absence of Surfactant A was unstable and separated. The higher Emulsifier B content of 0.8 wt % in 3315-43-K made in the absence of Surfactant A showed less separation, but high viscosity.

The results show a reduction in viscosity with the addition of the anionic surfactant at levels starting at 0.05% wt. The emulsion system begins to show a viscosity increase at 0.7% wt. surfactant, which is the first sign of emulsion inversion into an oil-in-water emulsion. When the surfactant amount is increased to 0.8% wt. in the formulation, the emulsion inverts to a water continuous emulsion. This study indicates that optimal viscosity reduction is produced at levels between 0.05% wt. and below 0.7% wt. of Surfactant A. The emulsion resistance to phase separation is best between 0.1% wt. and 0.6% wt. Surfactant A. The resistivity values of the emulsion cleaners were all greater than 0.4% wt.

The anionic Surfactant B was not as effective as the Surfactant A but did show a significant viscosity reduction at the 0.3% wt. level, good resistivity value of 0.4 Mohms and 0% top phase separation upon 24 hours at rest. The effectiveness of Surfactant B began to drop at 0.4% wt. levels as indicated by the higher viscosity and lower resistivity value. At 0.5% wt Surfactant B, the emulsion system inverted into a water continuous phase (oil in water) emulsion with a 0.0 Mohms resistivity. The 0.05% wt. Surfactant B sample did not show a significant viscosity difference.

Performance Testing

Two performance methods were used to evaluate multiple blends. The first method evaluated the amount of cleaner required to dissolve through a semi-evaporated paint film of specific wet-applied film thickness. This method provides a relative performance rating to simulate paint application delivery equipment spray cap or bell cup cleaning ability. Bell cups and spray caps are exposed to high volumes of air flow and tend to dry to a semi-evaporated and tacky state.

Solvent Performance Drop Test Procedure II

Using a draw down square, apply two mils of wet paint to a glass panel. Place the glass panel at a 45-degree angle. Allow the panels to flash dry for 15 minutes before beginning the test. Using a 1/32 ID tubing 200 µl of purge solvent was dispensed from a 10 ml glass syringe at 0.5 ml/hr using the Cole-Parmer 74900 series Syringe Pump. There was a 24 cm drop distance that contacted the panel at a 45° angle. Each drop contacted the panel at the same point. The volume of solvent in microliters (µl) needed to penetrate through the paint film exposing the bare glass is recorded.

The second performance test was designed to evaluate the ability of the cleaner to remove wet paint from a Teflon hose. This method provides a relative performance rating to simulate paint removal from the internal tubing, flow regulator and color tree chamber of paint application delivery equipment. This bench method does not incorporate any turbulence so that a true measure of solvency strength can be determined.

Wet on Wet Solvency Performance Test in Tubing Procedure:

Using a dual syringe pump, set the pump up with 29" of 1/32" tubing and fill up the tubing completely with paint. Connect tubing to a pumpable source of the cleaner to be tested. Set the pump to run at 0.8 ml/min. Turn the pump on, and start collecting 100 ul increments onto a 47 mm disk filter at specific ul increments. The beginning collection should have a visual amount of paint and the last increment collected should only have a slight residue of paint. Record the total volume for the disk filter that resulted in a slight residue as the amount total amount necessary to clean the paint out of the delivery tubing.

Example 10

Paint line flushing cleaner formulations as described in Table 46 were prepared according to the procedure of Example 1. All Formulations of Table 46 included 0.2% DPG

TABLE 46

| ID | IPAc | MAK | MPK | A-100 | A-150 | Emul. A | Emul. B | Surf. A | DI Water | Total |
|---|---|---|---|---|---|---|---|---|---|---|
| 3315-43-B | 15.0% | | | 33.0% | 2.0% | | 0.5% | 0.2% | 49.1% | 100.0% |
| 3315-43-D | 12.0% | | | 26.4% | 1.6% | 0.3% | | 0.2% | 59.3% | 100.0% |
| 3315-43-E | 12.0% | | | 26.4% | 1.6% | | 0.5% | 0.2% | 59.1% | 100.0% |
| 3315-43-H | 9.0% | | | 19.8% | 1.2% | | 0.5% | 0.2% | 69.1% | 100.0% |
| 3315-43-W | | | 12.0% | 26.4% | 1.6% | | 0.5% | 0.2% | 59.1% | 100.0% |
| 3315-43-X | | | 9.0% | 19.8% | 1.2% | | 0.5% | 0.2% | 69.1% | 100.0% |
| 3315-43-Y | | 12.0% | | 26.4% | 1.6% | | 0.5% | 0.2% | 59.1% | 100.0% |
| 3315-43-Z(2) | | 9.0% | | 19.8% | 1.2% | | 0.5% | 0.2% | 69.1% | 100.0% |
| 3315-43-DD | 9.0% | | | 19.8% | 1.2% | | 0.5% | 0.4% | 68.9% | 100.0% |
| 3315-43-HH | 9.0% | | | 19.8% | 1.2% | | 0.5% | | 69.0% | 100.0% |
| 3315-43-NN | 19.8% | | | 9.0% | 1.2% | | 0.5% | 0.4% | 68.9% | 100.0% |
| 3315-43-OO | | 19.8% | | 9.0% | 1.2% | | 0.5% | 0.4% | 68.9% | 100.0% |

Each formulation was tested three times according to the Solvent Performance Drop Test Procedure II. The average number of microliters required is provided in the table below.

TABLE 47

Solvent Performance Drop Test Procedure II

| ID | Dupont White | Dupont Red | Dupont Silver Metal |
|---|---|---|---|
| 3315-43-B | 101.33 | 117.00 | 91.00 |
| 3315-43-E | 88.33 | 163.33 | 119.00 |
| 3315-43-H | 153.00 | 99.00 | 130.00 |
| 3315-43-W | 84.33 | 111.33 | 94.00 |
| 3315-43-X | 143.67 | 123.00 | 143.33 |
| 3315-43-Y | 106.33 | 110.00 | 114.67 |
| 3315-43-Z2 | 140.00 | 104.33 | 140.33 |
| 3315-43-DD | 151.00 | 125.00 | 133.67 |
| 3315-43-HH | 169.67 | 163.67 | 150.33 |
| 3315-43-NN | 113.33 | 134.67 | 94.33 |
| 3315-43-OO | 106.00 | 101.00 | 104.33 |
| Commercial Cleaner 2 | 43.67 | 44.33 | 39.33 |

Commercial Cleaner 2 was a 100 wt. % solvent blend reported by the manufacturer as 60% acetone, the remainder being heptane, aromatic hydrocarbons, isopropyl alcohol, and n-butyl acetate.

The formulations of Table 46 were also tested using the Wet on Wet Solvency Performance Test in Tubing. Results are shown in Table 48.

TABLE 48

Wet on Wet Solvency Performance Test in Tubing

| Formula | (ul) of cleaner required to clean Paint A | (ul) of cleaner required to clean Paint B | (ul) of cleaner required to clean Paint C |
|---|---|---|---|
| 3315-43-B | 2000 | 1500 | >1500 |
| 3315-43-E | 1500 | 1500 | 1500 |
| 3315-43-H | 1300 | 1300 | 1200 |
| 3315-43-X | 1300 | 1300 | 1200 |
| 3315-43-Y | 1500 | 1500 | >1500 |
| 3315-43-W | 1300 | 1300 | 1500 |
| 3315-43-DD | 1500 | 1500 | 1500 |
| 3315-43-HH | 1500 | 1500 | 1500 |
| 3315-43-OO | 1000 | 1300 | 1200 |
| 3315-43-NN | 1300 | 1300 | 1500 |
| Commercial Cleaner 3 | 2000 | 2000 | |
| Toluene | | | >2000 |

The Commercial Cleaner 3 is a solvent blend that contains 30% wt. acetone, 15% wt. butanone, 41% wt. xylene, 2% wt. ethyl benzene and 12% wt. toluene based on a gas chromatographic analysis. Paint A was Enamelite Inc. 2K Piano Black, Paint B was Enamelite Inc. 2K Lt Tarnish Silver and Paint C was Haworth Regiment Red Solvent-based.

This test method was designed to evaluate non-turbulent flow. Overall, each of the emulsion systems produced a filter disc with less paint residue than the two controls, toluene and Commercial Cleaner 3. The 3315-43-OO and 3315-43-H performed the best overall on the 3 paint systems tested. The 3315-43-H, -HH and -DD were similar formulations but different levels of surfactant. The 3315-43-H performed better on all 3 paints screened by the wet on wet line purge method. Another interesting trend was noticed in the solvent loading study with the levels of emulsifiers, anionic surfactant stabilizers and paint compatibility additives remaining constant. The data indicates that as the solvent loading level increased the performance of the cleaner decreased.

What is claimed is:

1. A water-in-solvent emulsion comprising:
a solvent continuous phase and a discontinuous water phase, the emulsion comprising:
(A) a solvent blend having low solubility in water present in an amount of no more than about 60 wt %;

(B) water;
(C) at least one emulsifier different from (A)-(B) comprising non-ionic block copolymers;
(D) at least one emulsion stability additive, comprising at least one surfactant different from (A)-(C); and
(E) at least one paint compatibility additive and/or stabilizer different from (A)-(D);
(A)-(E) being selected such that said emulsion has a viscosity of less than 50 cps.

2. The water-in-solvent emulsion of claim 1, wherein the at least one solvent or solvent blend has a water saturation level in solvent of less than 10% wt and (C) comprising an emulsifier having 2 or more hydrophobic groups containing greater than 18 carbons atoms per group and a hydrophilic group being essentially made up of ethylene oxide repeat units.

3. The water-in-solvent emulsion of claim 1, wherein the at least one emulsifier comprises non-ionic surfactants containing alcohol function end groups.

4. The water-in-solvent emulsion of claim 1, wherein the at least one emulsifier comprises non-ionic block copolymers selected from:
1) emulsifiers having a block structure: ABA
where B is Polypropylene oxide containing 40 or greater repeat units
where A is Polyethylene oxide containing 20 or less repeat units; and/or
2) emulsifiers having a block structure: $[(A)(B)]_2(Y)[(A)(B)]_2$
where Y contains tetra functional groups capable of making alkoxylated chains,
where A contains polyethylene oxide repeat units,
where B contains polypropylene oxide (or polybutylene oxide) repeat units having greater than 20 repeat units per chain end.

5. The water-in-solvent emulsion of claim 1, wherein the at least one emulsifier comprises non-ionic surfactants comprising polyether polyols having an alcohol terminal group.

6. The water-in-solvent emulsion of claim 1, wherein the at least one emulsion stability additive comprises an anionic surfactant.

7. A water-in-solvent emulsion comprising:
a solvent continuous phase and a discontinuous water phase, the emulsion comprising:
(A) at least one solvent having low solubility in water;
(B) water;
(C) at least one emulsifier different from (A)-(B);
(D) at least one emulsion stability additive, comprising at least one anionic surfactant different from (A)-(C); and
(E) optionally at least one paint compatibility additive and/or stabilizer different from (A)-(D)
wherein the anionic surfactant comprises dioctyl sodium sulfosuccinate and/or 2-ethylhexyl sodium sulfosuccinate.

8. The water-in-solvent emulsion of claim 1 comprising a paint compatibility additive comprising an aromatic hydrocarbon solvent comprising naphthalene and trimethylbenzene, having a vapor pressure of 0.62 mmHg at 68° F., a solubility in water of less than 0.01 wt. % at 77° F. and a flashpoint of 145° F. (TCC ASTM D56), and 0.01 to 0.3 wt % dipropylene glycol.

9. A water-in-solvent emulsion having a solvent continuous phase and a discontinuous water phase, the emulsion comprising:
about 30% to 60% by weight of one or more solvents, based on total weight of the one or more solvents plus water, the one or more solvents being selected such that no more than 10% wt, of the emulsion is comprised of organic solvents having a water-in-solvent solubility greater than 10% by wt, in water;
10% to 70% by weight water, based on total weight of the one or more solvents plus water;
about 0.01 to 5% by weight of a non-ionic emulsifier having a solubility in water of less than 15% by weight and a molecular weight of greater than 1000 g/mole,
optionally 0.0 to 5% wt, paint compatibility additives having less than 0.2 mm Hg @ 20° C. solvents;
optionally 0.0 to 0.9% wt, anionic emulsion stability additives.

10. A water-in-solvent emulsion having a solvent continuous phase and a discontinuous water phase, the emulsion comprising:
10-20% wt. isopropyl acetate or methyl propyl ketone;
30-40% wt. aromatic hydrocarbon solvent having a vapor pressure of 2.09 mmHg at 68° F., a solubility in water of 0.02 wt. % at 77° F. and a flashpoint of 108° F. (TCC ASTM D56), said aromatic hydrocarbon solvent comprising trimethylbenzene, xylene and cumene;
0.0 to 7.0% wt. of an aromatic hydrocarbon solvent comprising naphthalene and trimethylbenzene;
0.03 to 4.0% wt. of an emulsifier comprising at least one polyether polyol;
0.01 to 4.0% wt. dipropylene glycol;
0.01 to 0.8% wt. of an anionic surfactant; and
water.

11. The water-in-solvent emulsion of claim 9 wherein the non-ionic emulsifier is selected from:
1) emulsifiers having a block structure: ABA
where B is Polypropylene oxide containing 40 or greater repeat units
where A is Polyethylene oxide containing 20 or less repeat units; and/or
2) emulsifiers having a block structure: $[(A)(B)]_2(Y)[(A)(B)]_2$
where Y contains tetra functional groups capable of making alkoxylated chains,
where A contains polyethylene oxide repeat units,
where B contains polypropylene oxide (or polybutylene oxide) repeat units having greater than 20 repeat units per chain end.

12. The water-in-solvent emulsion of claim 1 wherein
A. is present as about 30% to 60% by weight of a solvent blend selected such that
the solvent blend vapor pressure is greater than 0.1 mm Hg at 20° C.;
the solvent blend contains less than 20% weight of a solvent or solvents having a water solubility greater than 10% by weight water in the individual solvent;
B. is present as about 20% to 75% by weight water;
C. is present as about 0.01 to 5% by weight of an emulsifier having a water solubility less than 10% by weight in water;
wherein the emulsion has a resistivity greater than 10 Kohms measured at 20° C.

13. The water-in-solvent emulsion of claim 7, wherein the at least one solvent has a water saturation level in solvent of less than 10% wt and (C) comprises an emulsifier having 2 or more hydrophobic groups containing greater than 18 carbons atoms per group and a hydrophilic group being essentially made up of ethylene oxide repeat units.

14. The water-in-solvent emulsion of claim 7, wherein the at least one emulsifier comprises non-ionic surfactants containing alcohol functional end groups.

15. The water-in-solvent emulsion of claim 7 wherein the at least one emulsifier is a non-ionic emulsifier is selected from:
1) emulsifiers having a block structure: ABA
    where B is Polypropylene oxide containing 40 or greater repeat units
    where A is Polyethylene oxide containing 20 or less repeat units; and/or
2) emulsifiers having a block structure: $[(A)(B)]_2(Y)[(A)(B)]_2$
    where Y contains tetra functional groups capable of making alkoxylated chains,
    where A contains polyethylene oxide repeat units,
    where B contains polypropylene oxide (or polybutylene oxide) repeat units having greater than 20 repeat units per chain end.

16. The water-in-solvent emulsion of claim 7, wherein the at least one emulsifier comprises non-ionic surfactants comprising polyether polyols having an alcohol terminal group.

17. The water-in-solvent emulsion of claim 7 wherein the paint compatibility additive is present as an aromatic hydrocarbon solvent comprising naphthalene and trimethylbenzene and 0.01 to 0.3 wt % dipropylene glycol.

18. The water-in-solvent emulsion of claim 7 wherein
A. is present as about 30% to 80% by weight of a solvent blend selected such that the solvent blend contains less than 20% weight of a solvent or solvents having a water solubility greater than 10% by weight water in the individual solvent;
B. is present as about 20% to 75% by weight water;
C. is present as about 0.01 to 5% by weight of an emulsifier having a water solubility less than 10% by weight in water;
wherein the emulsion has a resistivity greater than 10 Kohms measured at 20° C.

19. The water-in-solvent emulsion of claim 9, wherein the non-ionic emulsifier has 2 or more hydrophobic groups containing greater than 18 carbons atoms per group and a hydrophilic group being essentially made up of ethylene oxide repeat units.

20. The water-in-solvent emulsion of claim 9, wherein the non-ionic emulsifier comprises non-ionic surfactants containing alcohol functional end groups.

21. The water-in-solvent emulsion of claim 9, wherein the non-ionic emulsifier comprises non-ionic block copolymers selected from:
1) emulsifiers having a block structure: ABA
    where B is Polypropylene oxide containing 40 or greater repeat units
    where A is Polyethylene oxide containing 20 or less repeat units; and/or
2) emulsifiers having a block structure: $[(A)(B)]_2(Y)[(A)(B)]_2$
    where Y contains tetra functional groups capable of making alkoxylated chains,
    where A contains polyethylene oxide repeat units,
    where B contains polypropylene oxide (or polybutylene oxide) repeat units having greater than 20 repeat units per chain end.

22. The water-in-solvent emulsion of claim 9, wherein the anionic emulsion stability additives are present in an amount of 0.1 to 0.9 wt %.

23. The water-in-solvent emulsion of claim 9 comprising a paint compatibility additive comprising an aromatic hydrocarbon solvent comprising naphthalene and trimethylbenzene.

24. The water-in-solvent emulsion of claim 10, wherein the emulsifier comprises non-ionic block copolymers selected from:
1) emulsifiers having a block structure: ABA
    where B is Polypropylene oxide containing 40 or greater repeat units
    where A is Polyethylene oxide containing 20 or less repeat units; and/or
2) emulsifiers having a block structure: $[(A)(B)]_2(Y)[(A)(B)]_2$
    where Y contains tetra functional groups capable of making alkoxylated chains,
    where A contains polyethylene oxide repeat units,
    where B contains polypropylene oxide (or polybutylene oxide) repeat units having greater than 20 repeat units per chain end.

* * * * *